United States Patent
Lawrence et al.

(10) Patent No.: US 11,597,091 B2
(45) Date of Patent: Mar. 7, 2023

(54) ROBOTIC TARGET ALIGNMENT FOR VEHICLE SENSOR CALIBRATION

(71) Applicant: BPG Sales and Technology Investments, LLC, Ada, MI (US)

(72) Inventors: Jon D. Lawrence, Corvallis, OR (US); Ryan M. Jefferies, Grand Rapids, MI (US); Nicholas R. Nelson, Grand Rapids, MI (US)

(73) Assignee: BPG Sales and Technology Investments, LLC, Ada, MI (US)

( * ) Notice: Subject to any disclaimer, the term of this patent is extended or adjusted under 35 U.S.C. 154(b) by 194 days.

(21) Appl. No.: 16/731,340

(22) Filed: Dec. 31, 2019

(65) Prior Publication Data

US 2020/0130188 A1  Apr. 30, 2020

Related U.S. Application Data

(63) Continuation-in-part of application No. 16/398,404, filed on Apr. 30, 2019.
(Continued)

(51) Int. Cl.
*B25J 9/16*    (2006.01)
*G01S 17/86*   (2020.01)
(Continued)

(52) U.S. Cl.
CPC .......... *B25J 9/1679* (2013.01); *B25J 9/1005* (2013.01); *G01S 7/4972* (2013.01); *G01S 17/86* (2020.01)

(58) Field of Classification Search
CPC ... B25J 9/1679; B25J 11/00; B25J 5/02; B25J 9/1005; G01S 17/931; G01S 15/931;
(Continued)

(56) References Cited

U.S. PATENT DOCUMENTS 3,288,020 A  11/1966  Lill
3,630,623 A  12/1971  Schirmer et al.
(Continued)

FOREIGN PATENT DOCUMENTS

CN  1764818 A   4/2006
CN  100373129   3/2008
(Continued)

OTHER PUBLICATIONS

Screenshots from https://www.youtube.com/watch?v=7wdgc-RsewQ, uploaded on Jul. 31, 2015 by Dürr.
(Continued)

*Primary Examiner* — Behrang Badii
(74) *Attorney, Agent, or Firm* — Gardner, Linn, Burkhart & Ondersma LLP

(57) ABSTRACT

A robotic system and method for aligning a target to an equipped vehicle for calibration of a sensor on the equipped vehicle includes a vehicle support stand upon which an equipped vehicle is disposed in an established known position for calibration of the sensor, and a robotic manipulator having a multi-axis robotic arm configured to moveably hold a target. The robotic manipulator is configured to position the target into a calibration position relative to the sensor on the equipped vehicle by longitudinal movement of the robotic manipulator relative to the vehicle support stand and by movement of the robotic arm based on the established known position of the equipped vehicle on the vehicle support stand whereby the sensor is able to be calibrated using the target.

22 Claims, 17 Drawing Sheets

Related U.S. Application Data

(60) Provisional application No. 62/798,268, filed on Jan. 29, 2019, provisional application No. 62/786,896, filed on Dec. 31, 2018, provisional application No. 62/664,323, filed on Apr. 30, 2018.

(51) Int. Cl.
  *G01S 7/497* (2006.01)
  *B25J 9/10* (2006.01)

(58) Field of Classification Search
  CPC .. G01S 13/931; G01S 7/52004; G01S 7/4026; G01S 7/4086; G01S 17/86; G01S 7/4972
  See application file for complete search history.

(56) References Cited

U.S. PATENT DOCUMENTS

| | | |
|---|---|---|
| 3,918,816 A | 11/1975 | Foster et al. |
| 4,249,824 A | 2/1981 | Wiederrich et al. |
| 4,303,338 A | 12/1981 | Morrison et al. |
| 4,337,581 A | 7/1982 | Eck |
| 4,416,065 A | 11/1983 | Hunter |
| 4,444,496 A | 4/1984 | Dale, Jr. |
| 4,639,878 A | 1/1987 | Day et al. |
| 4,647,208 A | 3/1987 | Bieman |
| 4,690,557 A | 9/1987 | Wiklund |
| 4,724,480 A | 2/1988 | Hecker et al. |
| 4,726,122 A | 2/1988 | Andersson |
| 4,863,266 A | 9/1989 | Masuko et al. |
| RE33,144 E | 1/1990 | Hunter et al. |
| 4,899,218 A | 2/1990 | Waldecker et al. |
| 4,931,964 A | 6/1990 | Titsworth et al. |
| 5,018,853 A | 5/1991 | Hechel et al. |
| 5,044,746 A | 9/1991 | Henseli |
| 5,048,954 A | 9/1991 | Madey et al. |
| 5,054,918 A | 10/1991 | Downing et al. |
| 5,140,533 A | 8/1992 | Celette |
| 5,177,558 A | 1/1993 | Hill |
| 5,177,563 A | 1/1993 | Everett et al. |
| 5,198,877 A | 3/1993 | Schulz |
| 5,249,364 A | 10/1993 | Bishop |
| 5,259,246 A | 11/1993 | Stuyts |
| 5,268,731 A | 12/1993 | Fuchiwaki et al. |
| 5,274,433 A | 12/1993 | Madey et al. |
| 5,291,264 A | 3/1994 | Longa et al. |
| 5,489,983 A | 2/1996 | McClenahan et al. |
| 5,519,489 A | 5/1996 | McClenahan et al. |
| 5,532,816 A | 7/1996 | Spann et al. |
| 5,559,695 A * | 9/1996 | Daily .............. G01S 11/12 701/1 |
| 5,583,797 A | 12/1996 | Fluegge et al. |
| 5,600,893 A | 2/1997 | Phillips |
| 5,675,408 A | 10/1997 | Samuelsson et al. |
| 5,703,796 A | 12/1997 | Moradi et al. |
| 5,724,129 A | 3/1998 | Matteucci |
| 5,724,743 A | 3/1998 | Jackson |
| 5,731,870 A | 3/1998 | Bartko et al. |
| 5,760,938 A | 6/1998 | Hodge |
| 5,781,286 A | 7/1998 | Knestel |
| 5,812,256 A | 9/1998 | Chapin et al. |
| 5,815,257 A | 9/1998 | Haas |
| 5,818,574 A | 10/1998 | Jones et al. |
| 5,870,315 A | 2/1999 | January |
| 5,930,881 A | 8/1999 | Naruse et al. |
| 5,978,077 A | 11/1999 | Koerner et al. |
| 6,078,846 A | 6/2000 | Greer et al. |
| 6,100,923 A | 8/2000 | Sass et al. |
| 6,115,927 A | 9/2000 | Hendrix |
| 6,148,528 A | 11/2000 | Jackson |
| 6,161,419 A | 12/2000 | Langlechner |
| 6,226,879 B1 | 5/2001 | Baird |
| 6,285,959 B1 | 9/2001 | Greer |
| 6,363,619 B1 | 4/2002 | Schirmer et al. |
| 6,397,164 B1 | 5/2002 | Nobis et al. |
| 6,400,451 B1 | 6/2002 | Fukuda et al. |
| 6,404,486 B1 | 6/2002 | Nobis et al. |
| 6,412,183 B1 | 7/2002 | Uno |
| 6,424,411 B1 | 7/2002 | Rapidel et al. |
| 6,456,372 B1 | 9/2002 | Hudy |
| 6,473,978 B1 | 11/2002 | Maas |
| 6,483,577 B2 | 11/2002 | Stieff |
| 6,522,400 B1 | 2/2003 | Horn |
| 6,532,673 B2 | 3/2003 | Jahn et al. |
| 6,542,840 B2 | 4/2003 | Okamoto et al. |
| 6,545,750 B2 | 4/2003 | Roth et al. |
| 6,559,936 B1 | 5/2003 | Colombo et al. |
| 6,640,612 B2 | 11/2003 | Corghi |
| 6,657,711 B1 | 12/2003 | Kitagawa et al. |
| 6,658,749 B2 | 12/2003 | Jackson et al. |
| 6,658,751 B2 | 12/2003 | Jackson et al. |
| 6,690,456 B2 | 2/2004 | Bux et al. |
| 6,691,062 B1 | 2/2004 | Nobis |
| 6,707,557 B2 | 3/2004 | Young, Jr. et al. |
| 6,710,866 B1 | 3/2004 | Adolph |
| 6,714,291 B2 | 3/2004 | Castagnoli et al. |
| 6,731,382 B2 | 5/2004 | Jackson et al. |
| 6,744,497 B2 | 6/2004 | Burns, Jr. |
| 6,748,796 B1 | 6/2004 | Van Den Bossche |
| 6,765,664 B2 | 7/2004 | Groothuis et al. |
| 6,766,229 B2 | 7/2004 | Dry et al. |
| 6,796,035 B2 | 9/2004 | Jahn et al. |
| 6,796,043 B2 | 9/2004 | Jackson et al. |
| 6,802,130 B2 | 10/2004 | Podbielski et al. |
| 6,813,015 B2 | 11/2004 | Knoedler et al. |
| 6,823,598 B1 | 11/2004 | Loescher |
| 6,823,601 B2 | 11/2004 | Murray |
| 6,829,046 B1 | 12/2004 | Groothuis et al. |
| 6,836,970 B2 | 1/2005 | Hirano |
| 6,839,972 B2 | 1/2005 | Jackson et al. |
| 6,842,238 B2 | 1/2005 | Corghi |
| 6,879,403 B2 | 4/2005 | Freifeld |
| 6,912,477 B2 | 6/2005 | Murray |
| 6,915,228 B2 | 7/2005 | Uffenkamp et al. |
| 6,931,340 B2 | 8/2005 | Jackson et al. |
| 6,959,253 B2 | 10/2005 | Jackson et al. |
| 6,968,282 B1 | 11/2005 | Jackson et al. |
| 7,062,861 B2 | 6/2006 | O'Mahony et al. |
| 7,065,462 B2 | 6/2006 | Merrill et al. |
| 7,075,635 B2 | 7/2006 | Groothuis et al. |
| 7,121,011 B2 | 10/2006 | Murray et al. |
| 7,230,694 B2 | 6/2007 | Forster et al. |
| 7,265,821 B1 | 9/2007 | Lawrence et al. |
| 7,331,211 B2 | 2/2008 | Harrill |
| 7,337,650 B1 * | 3/2008 | Preston .............. G01P 15/02 73/1.38 |
| 7,352,455 B2 | 4/2008 | Groothuis et al. |
| 7,380,344 B2 | 6/2008 | Dietrich |
| 7,382,913 B2 | 6/2008 | Dorranc et al. |
| 7,424,387 B1 | 9/2008 | Gill et al. |
| 7,501,980 B2 | 3/2009 | Focke et al. |
| 7,535,558 B2 | 5/2009 | Uffenkamp et al. |
| 7,570,352 B2 | 8/2009 | Flannigan et al. |
| 7,778,748 B2 | 8/2010 | Probst et al. |
| 7,779,544 B2 | 8/2010 | Tentrup et al. |
| 7,860,295 B2 | 12/2010 | Donner et al. |
| 7,864,309 B2 | 1/2011 | De Sloovere et al. |
| 7,907,265 B2 | 3/2011 | Tentrup et al. |
| 7,908,751 B2 | 3/2011 | Nobis et al. |
| 7,974,806 B1 | 7/2011 | Burns et al. |
| 8,096,057 B2 | 1/2012 | Schommer et al. |
| 8,107,062 B2 | 1/2012 | De Sloovere et al. |
| 8,127,599 B2 | 3/2012 | Schommer et al. |
| 8,131,017 B2 | 3/2012 | Bux et al. |
| 8,135,514 B2 | 3/2012 | Kelly et al. |
| 8,150,144 B2 | 4/2012 | Nobis et al. |
| 8,196,461 B2 | 6/2012 | Abraham et al. |
| 8,244,024 B2 | 8/2012 | Dorrance et al. |
| 8,254,666 B2 | 8/2012 | Uffenkamp et al. |
| 8,274,648 B2 | 9/2012 | Corghi |
| 8,363,979 B2 | 1/2013 | Abraham et al. |
| 8,400,624 B2 | 3/2013 | De Sloovere et al. |
| 8,418,543 B2 | 4/2013 | Tentrup et al. |
| 8,448,342 B2 | 5/2013 | Nobis et al. |

(56) References Cited

U.S. PATENT DOCUMENTS

| | | |
|---|---|---|
| 8,452,552 B2 | 5/2013 | Nobis et al. |
| 8,457,925 B1 | 6/2013 | Stieff et al. |
| 8,489,353 B2 | 7/2013 | Raphael |
| 8,492,701 B2 | 7/2013 | Nobis et al. |
| 8,522,609 B2 | 9/2013 | Nobis et al. |
| 8,538,724 B2 | 9/2013 | Corghi |
| 8,578,765 B2 | 11/2013 | Nobis et al. |
| 8,638,452 B2 | 1/2014 | Muhle et al. |
| 8,650,766 B2 | 2/2014 | Nobis et al. |
| 8,767,382 B2 | 7/2014 | Mori |
| 8,836,764 B2 | 9/2014 | Gruetzmann et al. |
| 8,854,454 B2 | 10/2014 | Abraham et al. |
| 8,918,302 B2 | 12/2014 | Hukkeri et al. |
| 9,001,189 B2 | 4/2015 | Nobis et al. |
| 9,127,937 B2 | 9/2015 | Nobis et al. |
| 9,134,120 B2 | 9/2015 | Schommer et al. |
| 9,170,101 B2 | 10/2015 | Stieff |
| 9,182,477 B2 | 11/2015 | Jones et al. |
| 9,212,907 B2 | 12/2015 | D'Agostino et al. |
| 9,279,670 B2 | 3/2016 | Schommer et al. |
| 9,279,882 B2 | 3/2016 | Hukkeri et al. |
| 9,377,379 B2 | 6/2016 | Lee |
| 9,448,138 B2 | 9/2016 | Stieff et al. |
| 9,539,866 B2 | 1/2017 | Mouchet |
| 9,545,966 B2 | 1/2017 | Kim |
| 9,581,524 B2 | 2/2017 | Liu |
| 9,645,051 B2 | 5/2017 | Jin |
| 9,658,062 B2 | 5/2017 | Duff et al. |
| 9,677,974 B2 | 6/2017 | Lee |
| 9,779,560 B1 | 10/2017 | Dorrance et al. |
| 9,779,561 B1 | 10/2017 | Dorrance et al. |
| 9,791,268 B2 | 10/2017 | Buzzi et al. |
| 10,001,429 B2 | 6/2018 | Krueger et al. |
| 10,068,389 B1 | 9/2018 | Strege et al. |
| 10,139,213 B2 | 11/2018 | Herrmann et al. |
| 10,222,455 B2 | 3/2019 | Stieff et al. |
| 10,240,916 B1 | 3/2019 | Golab et al. |
| 10,241,195 B1 | 3/2019 | Stieff et al. |
| 10,284,777 B2 | 5/2019 | Rogers et al. |
| 10,298,814 B2 | 5/2019 | Harrell et al. |
| 10,347,006 B2 | 7/2019 | Kunert et al. |
| 10,365,095 B2 | 7/2019 | D'Agostino et al. |
| 10,436,885 B2 * | 10/2019 | Wheeler ............... G06T 7/55 |
| 10,444,010 B2 | 10/2019 | Strege et al. |
| 10,475,201 B1 | 11/2019 | Hall et al. |
| 10,514,323 B2 | 12/2019 | Corghi |
| 10,567,650 B2 | 2/2020 | Rogers et al. |
| 10,634,488 B2 | 4/2020 | Stieff et al. |
| 10,670,392 B2 | 6/2020 | Rogers et al. |
| 10,684,125 B2 | 6/2020 | D'Agostino et al. |
| 10,692,241 B2 | 6/2020 | Kunert et al. |
| 10,692,308 B2 | 6/2020 | Cho et al. |
| 10,697,766 B1 | 6/2020 | Dorrance et al. |
| 10,788,400 B2 | 9/2020 | Stieff et al. |
| 10,848,316 B1 | 11/2020 | Stieff et al. |
| 10,871,368 B2 | 12/2020 | Krueger |
| 11,061,120 B2 * | 7/2021 | Castorena Martinez ..................... G01C 11/06 |
| 2002/0020071 A1 | 2/2002 | Jackson et al. |
| 2002/0099483 A1 | 7/2002 | Jackson et al. |
| 2004/0049930 A1 | 3/2004 | Murray |
| 2005/0022587 A1 | 2/2005 | Tentrup et al. |
| 2005/0096807 A1 | 5/2005 | Murray et al. |
| 2006/0090356 A1 | 5/2006 | Stieff |
| 2006/0279728 A1 | 12/2006 | Dorrance et al. |
| 2008/0007722 A1 | 1/2008 | Golab et al. |
| 2008/0148581 A1 | 6/2008 | Boni et al. |
| 2008/0186514 A1 | 8/2008 | Uffenkamp et al. |
| 2009/0046279 A1 | 2/2009 | Tentrup et al. |
| 2010/0060885 A1 | 3/2010 | Nobis et al. |
| 2010/0238291 A1 | 9/2010 | Pavlov et al. |
| 2010/0321674 A1 | 12/2010 | Corghi |
| 2011/0077900 A1 | 3/2011 | Corghi |
| 2011/0271749 A1 | 11/2011 | Tentrup et al. |
| 2012/0092654 A1 | 4/2012 | De Sloovere et al. |
| 2013/0110314 A1 | 5/2013 | Stieff |
| 2013/0188020 A1 | 7/2013 | Seifert et al. |
| 2013/0325252 A1 | 12/2013 | Schommer et al. |
| 2014/0129076 A1 | 5/2014 | Mouchet et al. |
| 2014/0253908 A1 | 9/2014 | Lee |
| 2014/0278226 A1 | 9/2014 | Stieff et al. |
| 2015/0049188 A1 | 2/2015 | Harrell et al. |
| 2015/0049199 A1 | 2/2015 | Rogers et al. |
| 2015/0134191 A1 | 5/2015 | Kim |
| 2016/0334209 A1 | 11/2016 | Linson |
| 2017/0003141 A1 | 1/2017 | Voeller et al. |
| 2017/0097229 A1 | 4/2017 | Rogers et al. |
| 2018/0060036 A1 | 3/2018 | Frisch et al. |
| 2018/0075675 A1 | 3/2018 | Kim |
| 2018/0094922 A1 | 4/2018 | Oki et al. |
| 2018/0100783 A1 | 4/2018 | Stieff et al. |
| 2018/0134529 A1 | 5/2018 | Zecher et al. |
| 2018/0188022 A1 | 7/2018 | Leikert |
| 2018/0259424 A1 | 9/2018 | Tentrup |
| 2018/0276910 A1 | 9/2018 | Pitt et al. |
| 2018/0299533 A1 | 10/2018 | Pliefke et al. |
| 2019/0204184 A1 | 7/2019 | Neumann et al. |
| 2019/0222723 A1 | 7/2019 | Harrell et al. |
| 2019/0249985 A1 | 8/2019 | Stieff et al. |
| 2019/0279395 A1 | 9/2019 | Kunert et al. |
| 2019/0331482 A1 | 10/2019 | Lawrence et al. |
| 2020/0074675 A1 | 3/2020 | Cejka et al. |
| 2020/0088515 A1 | 3/2020 | Rogers et al. |
| 2020/0117210 A1 | 4/2020 | Ren et al. |
| 2020/0130188 A1 | 4/2020 | Lawrence et al. |
| 2020/0273206 A1 | 8/2020 | Corghi |
| 2020/0309517 A1 | 10/2020 | D'Agostino et al. |
| 2020/0320739 A1 | 10/2020 | Kunert et al. |
| 2021/0387637 A1 | 12/2021 | Rogers et al. |

FOREIGN PATENT DOCUMENTS

| | | |
|---|---|---|
| CN | 107856649 | 3/2018 |
| DE | 2948573 | 6/1981 |
| DE | 19857871 C1 | 10/2000 |
| DE | 102009009046 A1 | 10/2009 |
| DE | 102009015207 | 9/2010 |
| EP | 0593066 | 4/1994 |
| EP | 0593067 | 4/1994 |
| EP | 0679865 A1 | 11/1995 |
| EP | 0766064 A2 | 4/1997 |
| EP | 0994329 | 4/2000 |
| EP | 1221584 | 7/2002 |
| EP | 1260832 A1 | 11/2002 |
| EP | 1505363 | 2/2005 |
| EP | 0946857 B1 | 7/2005 |
| EP | 0943890 B1 | 2/2007 |
| EP | 1376051 B1 | 1/2008 |
| EP | 1295087 B1 | 8/2010 |
| EP | 2302318 | 3/2011 |
| EP | 1818748 B1 | 5/2014 |
| EP | 2808082 | 12/2014 |
| EP | 3084348 B1 | 3/2017 |
| EP | 3036516 B1 | 4/2018 |
| EP | 3608687 A1 | 2/2020 |
| EP | 3228976 B1 | 11/2020 |
| JP | 200505389 A | 3/2005 |
| JP | 4530604 B2 | 8/2010 |
| JP | 2019529918 A | 10/2019 |
| KR | 1020070016095 A | 2/2007 |
| KR | 20100017607 A | 2/2010 |
| KR | 100948886 B1 | 3/2010 |
| KR | 101510336 B1 | 4/2015 |
| KR | 1020150105766 A | 9/2015 |
| KR | 20160137313 A | 11/2016 |
| KR | 101729619 B1 | 4/2017 |
| KR | 20190019403 A | 2/2019 |
| WO | 9515479 A1 | 6/1995 |
| WO | 2000071972 | 11/2000 |
| WO | 0231437 A1 | 4/2002 |
| WO | 2008014783 | 2/2008 |
| WO | 2008086773 A1 | 7/2008 |
| WO | 2008130385 A1 | 10/2008 |
| WO | 2010138543 | 12/2010 |

(56) References Cited

FOREIGN PATENT DOCUMENTS

| | | |
|---|---|---|
| WO | 2013079395 A1 | 6/2013 |
| WO | 2015092594 | 6/2015 |
| WO | 2017016541 | 2/2017 |
| WO | 2018035040 A1 | 2/2018 |
| WO | 2018067354 A1 | 4/2018 |
| WO | 2018153723 A1 | 8/2018 |
| WO | 2018158073 A1 | 9/2018 |
| WO | 2018167809 A1 | 9/2018 |
| WO | 2018188931 A1 | 10/2018 |
| WO | 2020056303 A1 | 3/2020 |
| WO | 2021005578 A1 | 1/2021 |

OTHER PUBLICATIONS

International Search Report and Written Opinion of the International Searching Authority from corresponding Patent Cooperation Treaty (PCT) Application No. PCT/IB2019/061464, dated Apr. 22, 2020.

ISRA Vision Systems Press Release, No. 97, May 16, 2006 "Mounting Wheels Automatically On Moving Car Bodies".

Dürr Factory Assembly Systems (FAS) materials, Dr. Thomas Tentrup, believed to be dated Sep. 2006, with partial translation of pp. 12-14.

Mahle Aftermarket Italy S.P.A., TechPRO Digital ADAS, 4 pages, Apr. 2019, Parma, Italy.

\* cited by examiner

ROBOTIC TARGET ALIGNMENT FOR VEHICLE SENSOR CALIBRATION

CROSS REFERENCE TO RELATED APPLICATION

The present application claims priority of U.S. provisional application Ser. No. 62/786,896 filed Dec. 31, 2018, and is a continuation-in-part of U.S. application Ser. No. 16/398,404 filed Apr. 30, 2019, which claims priority of U.S. provisional application Ser. No. 62/664,323 filed Apr. 30, 2018, and claims priority of U.S. provisional application Ser. No. 62/798,268 filed Jan. 29, 2019, which are hereby incorporated herein by reference in their entireties.

BACKGROUND AND FIELD OF THE INVENTION

The present invention is directed to a vehicle alignment/calibration method and system, and in particular to a method and system for aligning a vehicle and sensors of a vehicle to one or more autonomously positioned alignment/calibration targets.

The use of radar, imaging systems, and other sensors, such as LIDAR, ultrasonic, and infrared (IR) sensors, to determine range, velocity, and angle (elevation or azimuth) of objects in an environment are important in a number of automotive safety systems, such as an Advanced Driver Assistance System (ADAS) for a vehicle. A conventional ADAS system will utilize one or more sensors. While these sensors are aligned and/or calibrated by the manufacturer on the assembly line (or at another time or another facility), the sensors may need realignment or recalibration periodically, such as due to the effects of wear and tear, or misalignment due to driving conditions or through mishap, such as an accident. Furthermore, such an ADAS system may comprise one or more subsystems, e.g., adaptive cruise control (ACC), lane departure warning (LDW), parking assistance, and/or a rear-view camera, each of which may periodically require individual realignment or recalibration.

SUMMARY OF THE INVENTION

The present invention provides a method and system for aligning and/or calibrating a vehicle equipped sensor by aligning the vehicle and thereby the vehicle equipped sensor with one or more robotically positioned calibration targets. In positioning the one or more calibration targets, a robot selects and positions appropriate targets for alignment/calibration of one or more sensors of the ADAS system of the vehicle. The robot positions the appropriate targets according to a known reference position. The vehicle is also positioned and centered with respect to this known reference position. With the vehicle and calibration target positioned and centered with respect to the known reference position, the vehicle sensor is calibrated, such as via an original equipment manufacturer ("OEM") calibration process. In still other embodiments, a rear thrust angle for the vehicle may be determined, which may be used to adjust the position of the robotically positioned targets.

According to an aspect of the present invention, a robotic system for aligning a target to an equipped vehicle for calibration of a sensor on the equipped vehicle includes a stationary vehicle support stand upon which the equipped vehicle is stationarily disposed in an established known position for calibration of a sensor on the equipped vehicle, and includes a robotic manipulator that is moveable longitudinally toward and away from the vehicle support stand, with the robotic manipulator including a multi-axis robotic arm that holds a target. The robotic manipulator is configured to position the target into a calibration position relative to the sensor on the equipped vehicle by longitudinal movement of the robotic manipulator relative to the vehicle support stand and by movement of the robotic arm based on the established known position of the equipped vehicle on the vehicle support stand whereby the sensor is able to be calibrated using the target.

In accordance with particular embodiments, the robotic arm includes an end-effector configured to selectively grasp a target from a plurality of targets, and the robotic manipulator is mounted to a base that is longitudinally moveable along a track in a floor support surface, where the track includes rails disposed vertically lower than the floor support surface and along which the base is moveable. Alternatively the target may be an electronic digital display device configured to be able to display or show on a screen different patterns, grids or the like depending on vehicle make and model and sensor being calibrated, where a controller of the system causes the correct target pattern to be displayed based on the vehicle being tested.

In still further embodiments, the vehicle support stand includes multiple locator arms that are extendable and retractable and configured to press against tire and wheel assemblies of the equipped vehicle to orient the equipped vehicle on the vehicle support stand, including to orient the equipped vehicle into the established known position. The locator arms comprise sets of forward opposed arms and rearward opposed arms that are configured to extend equally in opposite directions from each other, such as for use in centering the equipped vehicle on the vehicle support stand.

According to a further aspect, the vehicle support stand includes moveable forward tire supports and moveable rearward tire supports upon which the opposed sets of tires of the equipped vehicle are disposed. The forward tire supports and/or the rearward tire supports may be configured as rollers, and the axis of rotation of the rollers may be aligned with the longitudinal axis of the equipped vehicle. In a particular embodiment, the forward tire supports each comprise two sets of rollers that are angled together in a V-shaped configuration for locating the equipped vehicle. The rearward tire supports may each comprise at least one set of rollers that are generally horizontally oriented.

According to yet another aspect of the present invention, the vehicle support stand may include a forward centering device and/or a rearward centering device that are disposed beneath the equipped vehicle when the equipped vehicle is disposed on the vehicle support stand. The forward and rearward centering devices include pairs of locator arms that are configured to extend outwardly synchronously to engage inner sides of the tire and wheel assemblies of the equipped vehicle.

In another embodiment, the vehicle support stand includes a pair of forward non-contact wheel alignment sensors and/or rearward non-contact wheel alignment sensors disposed adjacent the respective opposed tire and wheel assemblies of the equipped vehicle when disposed on the vehicle support stand. The non-contact wheel alignment sensors are operable to determine vehicle orientation information to determine the established known position of the equipped vehicle for use in positioning the target into the calibration position.

According to a further aspect of the present invention, a method for robotically aligning a target to an equipped vehicle for calibration of a sensor on the equipped vehicle includes maneuvering the equipped vehicle onto a stationary vehicle support stand, where the equipped vehicle includes a sensor and is stationarily disposed on the vehicle support stand, and moving a target held by a robotic manipulator into a calibration position for calibration of the sensor based on an established known position of the equipped vehicle on the vehicle support stand. The robotic manipulator is moveable longitudinally relative to the longitudinal axis of the equipped vehicle on the vehicle support stand and includes a multi-axis robotic arm configured to hold the target. The method may further include maneuvering the vehicle from the vehicle support stand, where the vehicle may be maneuvered by driving the vehicle onto and off the vehicle support stand. In a particular embodiment, the method involves an operator driving the vehicle onto the support stand and driving the vehicle off the support stand after calibration of a vehicle sensor, with the robotic manipulator being longitudinally moved away to allow the vehicle to be driven from the support stand and with the vehicle being driven over a track of the robotic manipulator.

In accordance with particular embodiments, the robotic manipulator includes an end-effector disposed on the robotic arm that is configured to selectively grasp a target from a plurality of targets, and the robotic manipulator is mounted to a base that is longitudinally moveable along a track in a floor support surface. The vehicle support stand may include multiple extendable and retractable locator arms that are configured to press against tire and wheel assemblies of the equipped vehicle to orient the equipped vehicle on the vehicle support stand, including to orient the equipped vehicle into the established known position, where the stand also includes moveable forward and rearward tire supports upon which the opposed sets of tires of the equipped vehicle are disposed. The equipped vehicle may be driven onto the support stand in a first direction and driven off the support stand after calibration of a sensor by being driven in the same first direction over the floor support surface. The method may include moving the robotic manipulator longitudinally away from the vehicle on the support stand in order to enable the equipped vehicle to be driven from the support stand in the first direction. Alternatively, the equipped vehicle in a first direction and driven off the support stand in an opposite direction after calibration of a sensor.

The method may further include the use of pairs of forward and/or rearward non-contact wheel alignment sensors disposed adjacent respective opposed tire and wheel assemblies of the equipped vehicle when disposed on the vehicle support stand, where the non-contact wheel alignment sensors are operable to determine vehicle orientation information to determine the established known position of the equipped vehicle for use in positioning the target into the calibration position.

The present invention provides a system and method for accurately positioning a calibration target relative to a sensor of a vehicle and calibrating the sensor, such as in accordance with OEM specifications. The accurate positioning and calibration of the sensor thus aids in optimizing the performance of the sensor to in turn enable the sensor to perform its ADAS functions. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
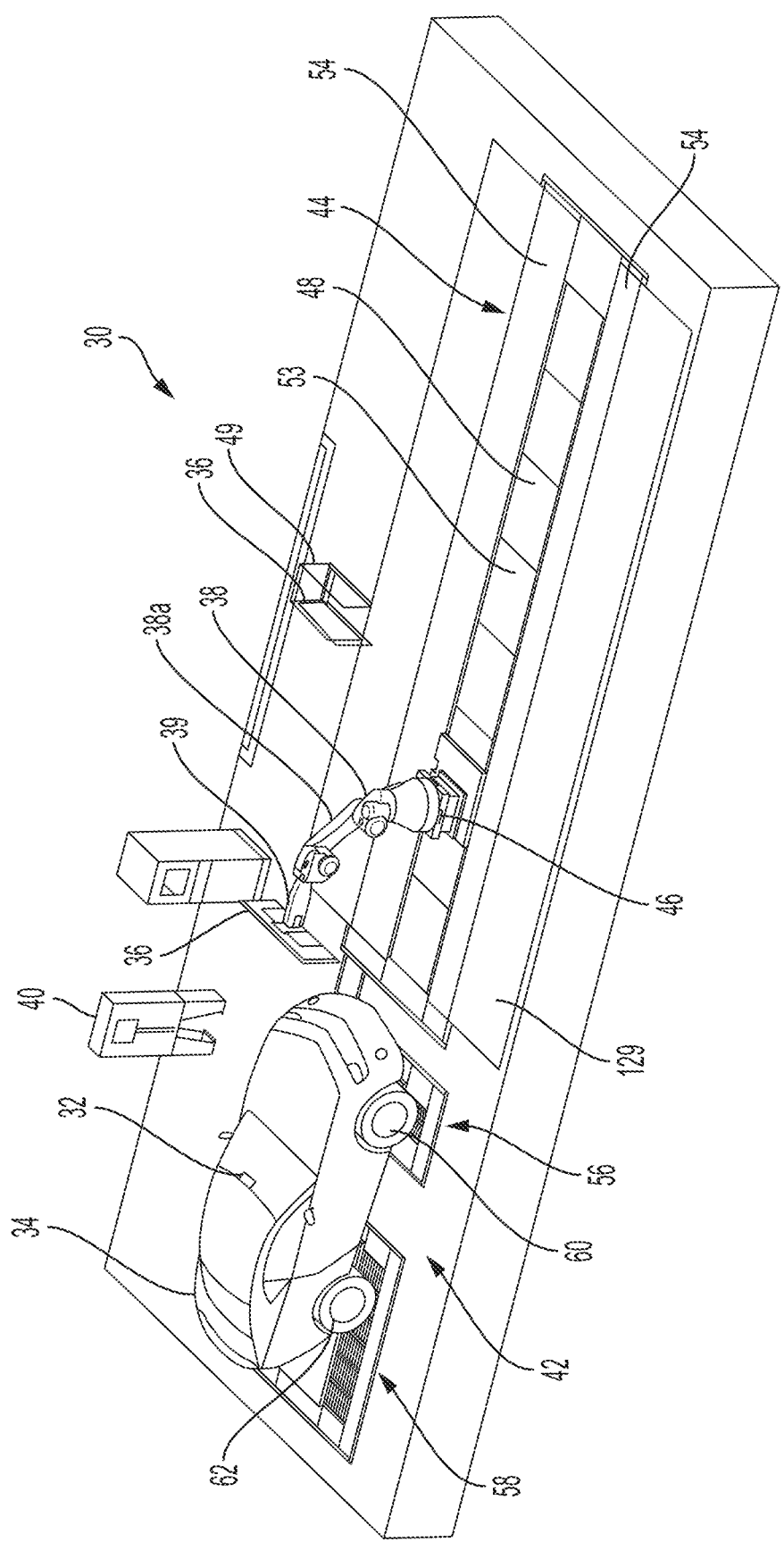
FIG. 1 is a perspective view of a robotic target alignment system for calibration of a sensor of a vehicle in accordance with the present invention.

FIG. 1 illustrates an exemplary robotic target alignment and ADAS sensor calibration system 30 for use in calibrating one or more sensors 32 of a vehicle 34 with a target or target panel 36 held by a moveable robot or robotic-manipulator 38 positioned in front of the vehicle 34. As discussed in detail below, the target 36 is positioned with respect to the vehicle 34 for calibrating/aligning one or more sensors 32 of the vehicle 34, where the target is adjustably moved via the robotic manipulator 38 into a known orientation or calibration position with respect to the vehicle 34, including with respect to sensor 32 of the vehicle. For example, upon orienting vehicle 34 into a known position, which may include determining the orientation of vehicle 34, robot 38 may move target 36 to align target 36 to one or more sensors 32 of vehicle 34. As discussed herein, the sensors to be calibrated are part of one or more subsystems of an exemplary Advanced Driver Assistance System (ADAS) of the vehicle. Sensors 32 may thus be radar sensors for adaptive cruise control ("ACC"), imaging systems such as camera sensors for lane departure warning ("LDW") and other ADAS camera sensors disposed about vehicle, as well as other sensors, such as LIDAR, ultrasonic, and infrared ("IR") sensors of an ADAS system, including sensors mounted inside the vehicle, such as forward facing cameras, or exterior mounted sensors, with the targets 36 supported by robot 38 constructed for calibration of such sensors, including grids, patterns, trihedrals, and the like. Upon aligning the target 36 with the sensor 32 of the vehicle 34, a calibration routine is performed whereby the sensor is calibrated or aligned using the target 36. As used herein, references to calibration of the sensor encompass alignment of the sensor with the calibration target.

Figure 2:
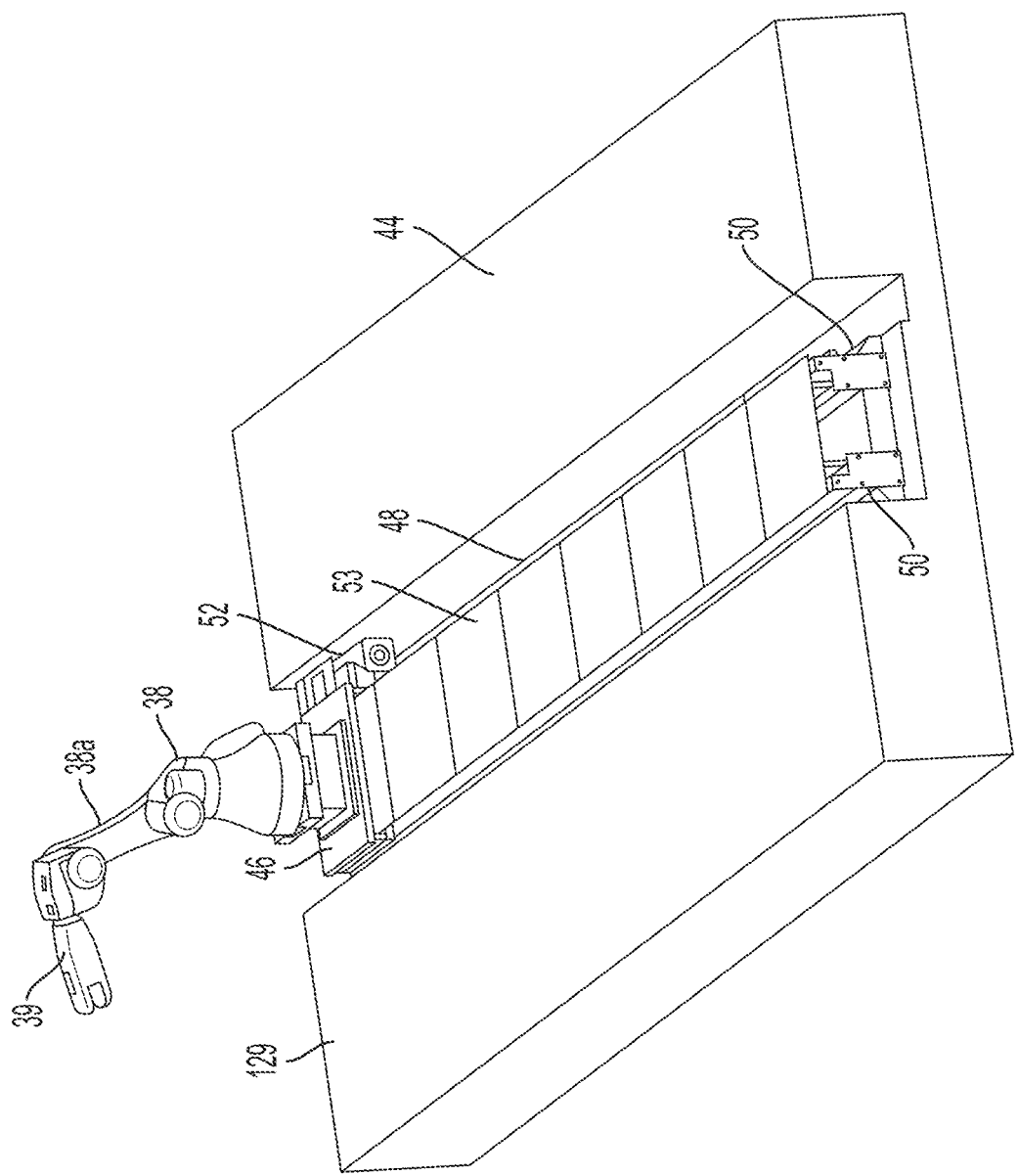
FIG. 2 is an end perspective view of the movable robot target holder of FIG. 1.

With further reference to FIG. 1, system 30 includes a computer system or controller 40, a vehicle support stand 42 upon which vehicle 34 is held stationary whereby vehicle 34 is longitudinally oriented with a robotic target positioning system 44. As understood from FIG. 2, target positioning system 44 includes the multi-axis robot 38 having multiple joints that is mounted to a moveable base 46, where base 46 is configured to move longitudinally along track 48 relative to vehicle 34. In particular, base 46 is mounted on longitudinally extending rails 50 whereby base 46 is moveable towards and away from vehicle 34 via an electric motor 52 that is provided control signals via controller 40. In the illustrated embodiment, track 48 is configured to enable base 46, and thereby robot 38, to be moved from between approximately 1 meter to 20 meters from vehicle 34 when vehicle 34 is disposed on stand 42, but preferably is moveable between approximately 1 meter to approximately between 7 to 10 meters. As shown, track 48 is positioned in front of or forward of vehicle 34. In the illustrated embodiment, track 48 is centrally aligned with support stand 42 whereby the longitudinal axis of vehicle 34 on support stand 42 is aligned with the longitudinal axis of track 48. Alternatively, track 48 may be laterally located on either side relative to the construction shown in FIG. 1. Base 46 of robotic manipulator 38 may conventionally comprise one or more load cells configured to detect and/or measure impact force to determine whether or not the robotic manipulator 38 has come into contact with something while manipulating a target 36 or when moving along the track 48. For example, the robotic manipulator 38 may be configured to stop motion should the robotic manipulator 38 come into contact with an object or person. As understood from FIG. 1, various plates 54 may be used to cover or partially cover gaps along or adjacent track 48. Accordingly, vehicle 34 may be maneuvered onto and off of support stand 42, including over track 48 of target positioning system 44, such as by driving vehicle 34. For example, vehicle 34 may be driven onto support stand 42 and, upon completion of calibration of a given sensor 32, vehicle 34 may be driven in the same direction off of support stand 42, with vehicle 34 being driven over track 48. Alternatively, vehicle 34 may be driven in an opposite direction off of support stand 42 upon calibration of sensor 32. For example, as understood with regard to the orientation of vehicle 34 in FIG. 1, vehicle may be driven forward onto support stand 42 and then driven in reverse off of support stand 42 upon calibration of sensor 32.

Figure 2A:
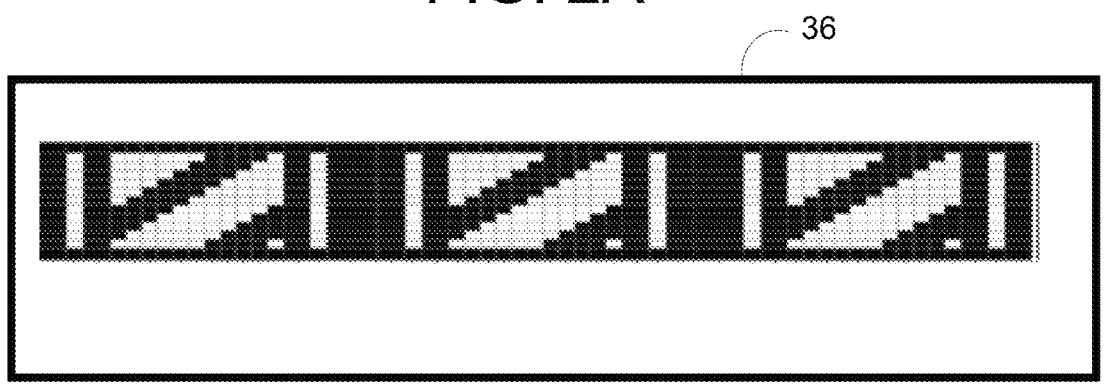
FIG. 2A is a front plan view of an exemplary target such as shown in FIG. 1.

Robot 38 includes a multi-axis arm 38a with numerous segments and joints, and includes an end effector or tool changer or target gripper 39 at an end of arm 38a for use in grasping the required target 36, where multiple targets may be disposed in a holder 49 adjacent track 48 within reach of robot 38. For example, holder 49 may include different types of targets for different types of sensors, as well as for different types of vehicle makes and models, whereby upon selecting the desired target for a particular vehicle under test, robot 38 will position the target into the appropriate position for calibrating of the particular ADAS sensor that is to be calibrated. As noted, various targets may be held by tool 39, including panels with grids, patterns, trihedrals, or other known targets for use in calibrating sensors. This includes, for example, targets for vision cameras, night vision systems, laser scanner targets, ultrasonic sensors, and the like, including for aligning or calibrating ACC (adaptive cruise control) sensors, LDW (lane departure warning) sensors, and night vision sensors of the vehicle. In an aspect of the present invention, a plurality of different target frames may be individually configured for different sensors, e.g., ACC, LDW, and night vision sensors. An exemplary pattern or grid is disclosed on target 36 in connection with FIG. 2A. It should be appreciated, however, that as discussed herein alternatively configured targets may be employed within the scope of the present invention, including alternative patterns, grids, and constructions of targets. Alternatively target 36 may be an electronic digital display device configured to be able to display or show on a screen different patterns, grids or the like depending on vehicle make and model and sensor being calibrated, where controller 40 is operable to cause the correct target pattern to be displayed based on the vehicle 34 and sensor 32 being calibrated.

Vehicle support stand 42 includes a forward wheel support and centering assembly 56 and a rearward wheel support and centering assembly 58 upon which vehicle 34 is disposed for positioning or orienting vehicle 34. In the orientation of FIG. 1, the front wheel assemblies 60 of vehicle 34 are located on forward wheel support and centering assembly 56 and the rear wheel assemblies 62 of vehicle 34 are located on rearward wheel support and centering assembly 58. As discussed in more detail below, assemblies 56, 58 enable lateral movement of vehicle 34 for purposes of positioning vehicle 34. In addition, forward wheel support and centering assembly 56 also provides longitudinal retention of vehicle 34. It should be appreciated that if desired a vehicle may be rearwardly oriented toward target positioning system 44, such as for calibration of one or more rearwardly oriented vehicle sensors, in which case the rear wheel assemblies 62 of vehicle 34 would be disposed on the forward wheel support assembly 56.

With reference to FIGS. 3-6, forward wheel support and centering assembly 56 includes oppositely disposed tire supports 64a, 64b positioned on opposite sides of forward vehicle centering device 66, where tire supports 64a, 64b are configured to receive the tires of a pair of opposed tire and wheel assemblies of vehicle 34, such as the front wheel assemblies 60 as shown in FIG. 1. Tire supports 64a, 64b are substantially identical, but mirror versions of each other. As such, the discussion herein focuses on tire support 64a, but it should be appreciated that the discussion applies to tire support 64b.

Figure 4:
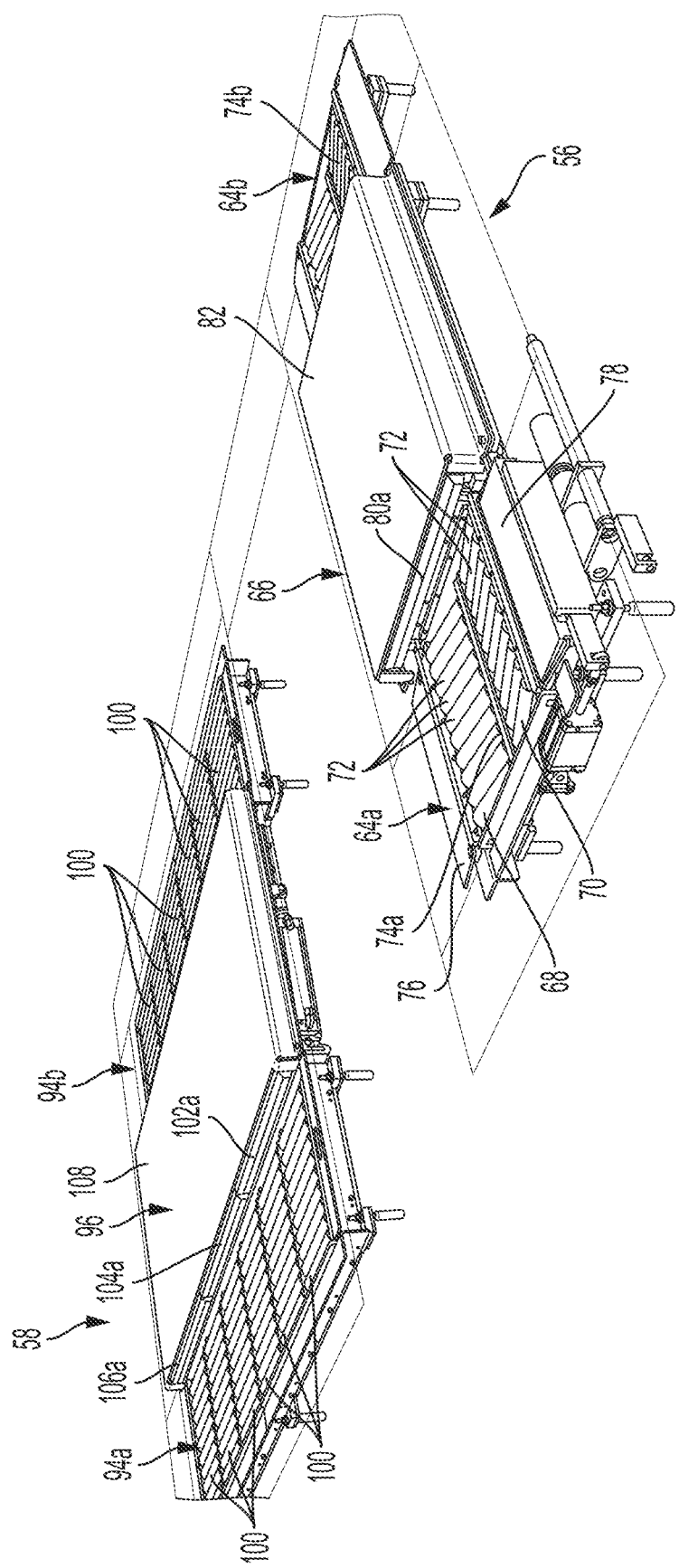
FIG. 4 is a perspective view of the vehicle centering system of FIG. 3.
Figure 5:
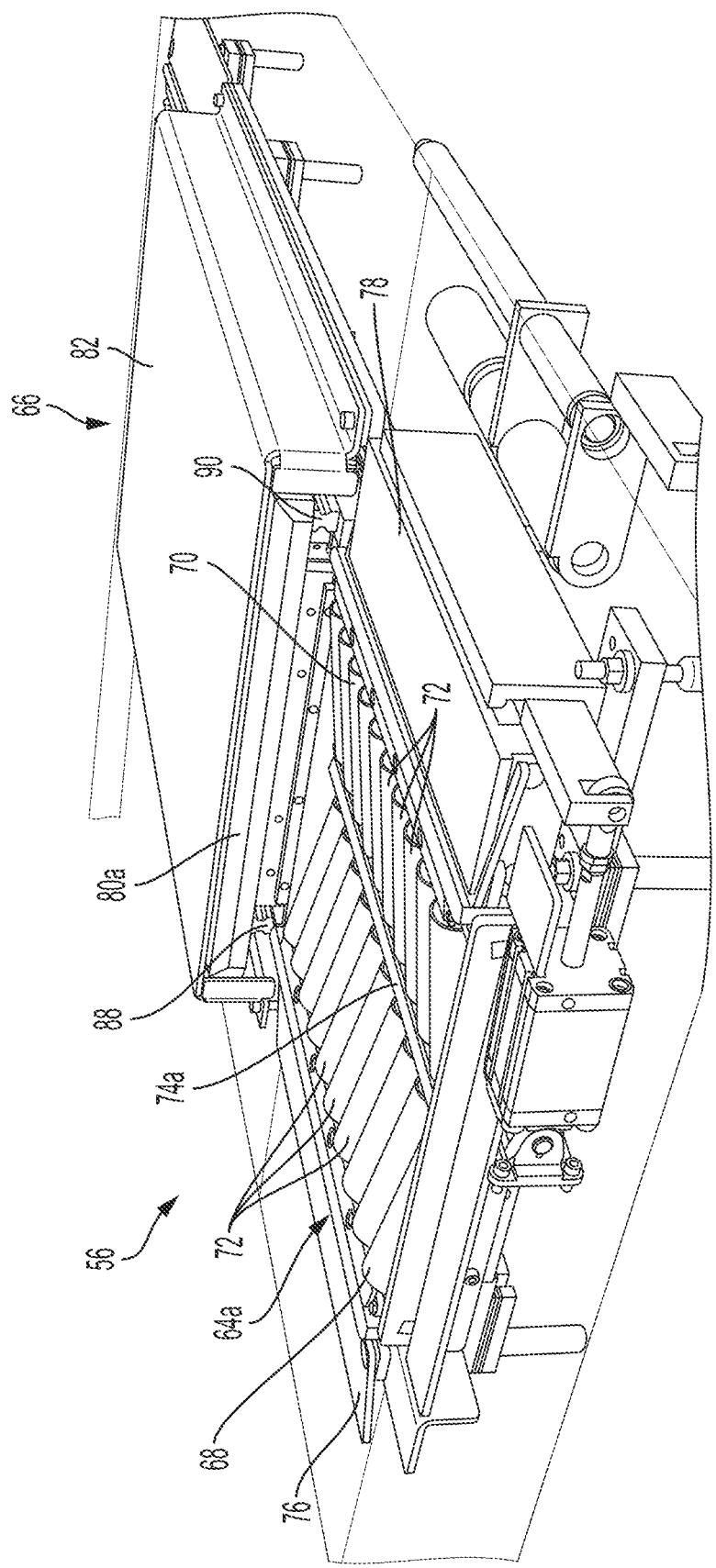
FIG. 5 is a side perspective view of the forward wheel assembly supports of the vehicle centering system of FIG. 3.
Figure 6:
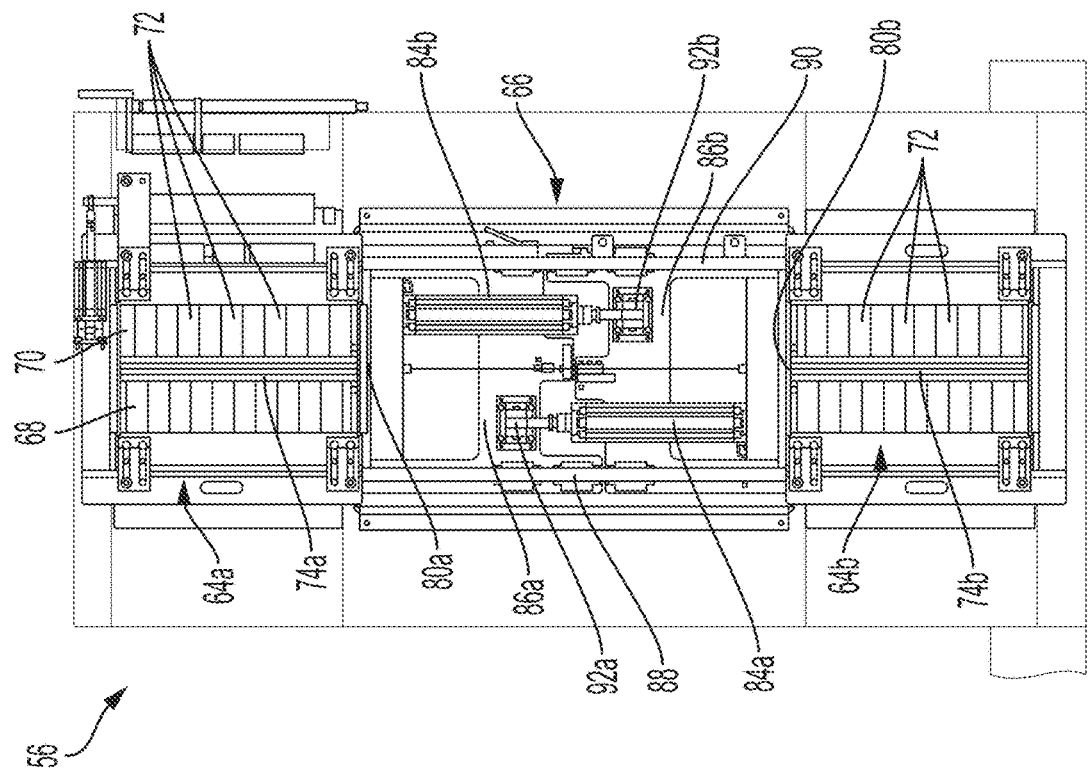
FIG. 6 is a bottom plan view of the forward wheel assembly supports of the vehicle centering system of FIG. 3.

Tire support 64a includes two sets 68, 70 of rollers 72 with the rollers 72 arranged with their axes of rotation parallel with the longitudinal axis of the vehicle 34 when disposed on support stand 42. As such, a vehicle having a pair of front tires disposed on rollers 72 will be moveable laterally with respect to its longitudinal axis via the rollers 72. As best shown in FIGS. 4 and 5, the sets 68, 70 of rollers 72 are inwardly angled with respect to each other. That is, the adjacently located ends of rollers 72 of each set 68, 70 are disposed vertically lower than the outwardly located ends in a V-shaped configuration. As such, the wheel assemblies 60 of vehicle 34 will be naturally oriented to rest in a fixed longitudinal position when located on tire supports 64a, 64b along the axes 74a, 74b defined by the adjacent mounting ends of rollers 72. It should be appreciated that the axes 74a, 74b are arranged so as to be aligned with each other and perpendicular to track 48 and the longitudinal axis of vehicle 34 when positioned on stand 42. Tire support 64a additionally includes ramps 76, 78 for supporting a vehicle tire as the vehicle 34 is driven onto and off of support stand 42.

Vehicle 34 is centered or positioned on support stand 42 in part via vehicle centering device 66, which is operable to center or position the forward portion of vehicle 34. Vehicle centering device 66 includes a pair of opposed synchronized arms or bumpers 80a, 80b that are configured to extend outwardly from housing 82 to contact the inner sidewalls of the tires disposed on tire supports 64a, 64b. Arms 80a, 80b in particular are synchronized to move outwardly from housing 82 equally and simultaneously in opposed directions via a pair of actuators 84a, 84b (FIG. 6) that are linked together and operated by controller 40. As understood from FIGS. 5 and 6, arm 84a is affixed to or part of plate 86a and arm 84b is affixed to or part of plate 86b, with plates 86a, 86b being slidably mounted on rails or slides 88, 90. Extendable end 92a of actuator 84a is mounted to plate 86a whereby extension of end 92a causes arm 84a to extend outwardly. Likewise, extendable end 92b of actuator 84b is mounted to plate 86b whereby extension of end 92b causes arm 84b to extend outwardly. The arms 80a, 80b are likewise retractable via retraction of ends 92a, 92b of actuators 84a, 84b. It should thus be appreciated that vehicle centering device 66 is operable to center the forward portion of vehicle 34 on vehicle support stand 42 by way of the rollers 72 allowing the vehicle to be laterally moved via equal and opposite extension of arms 80a, 80b whereby arms 80a, 80b contact and push against the inner sidewall of the tires.

Figure 3:
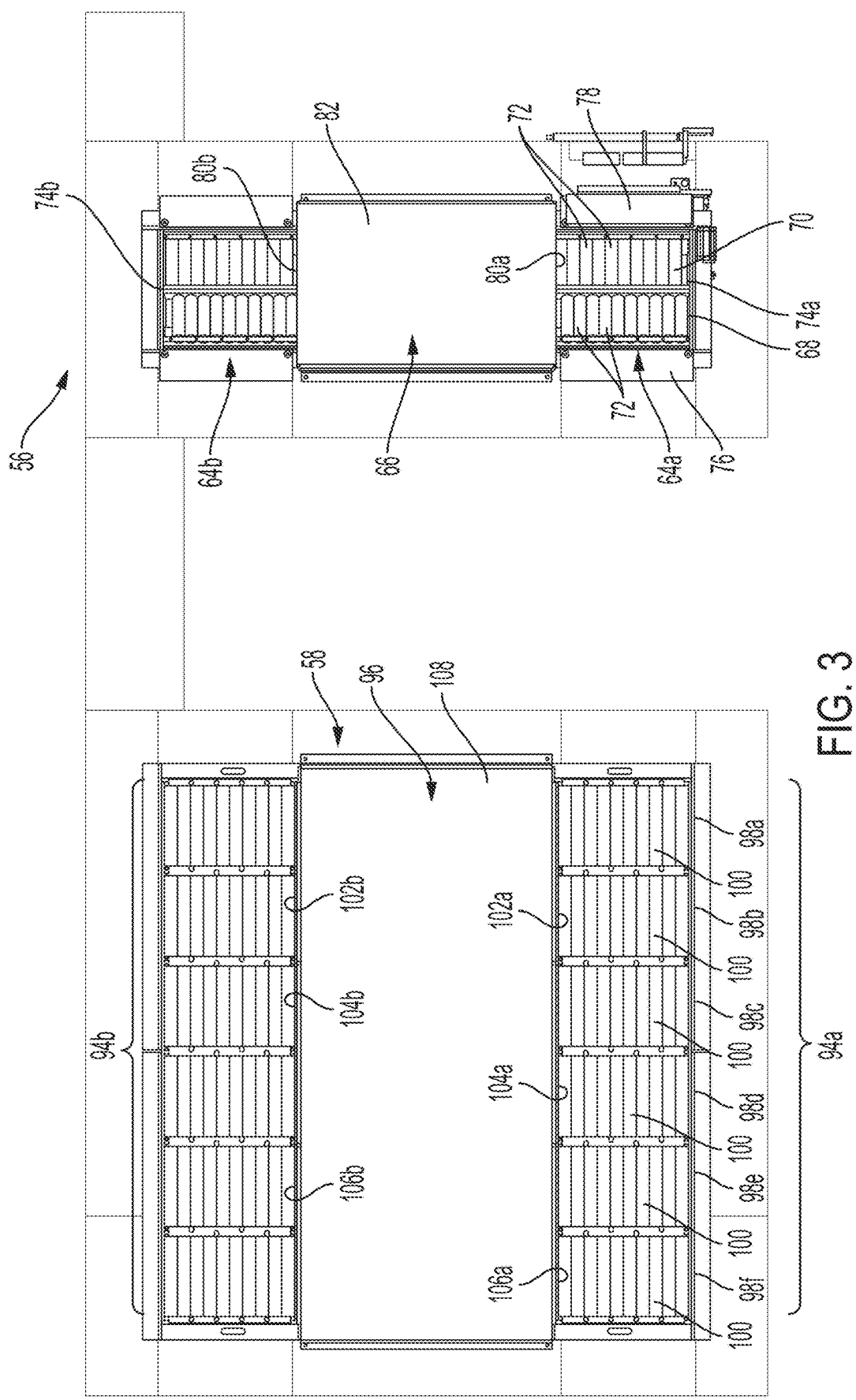
FIG. 3 is a top plan view of the vehicle centering system of the target alignment system of FIG. 1.
Figure 7:
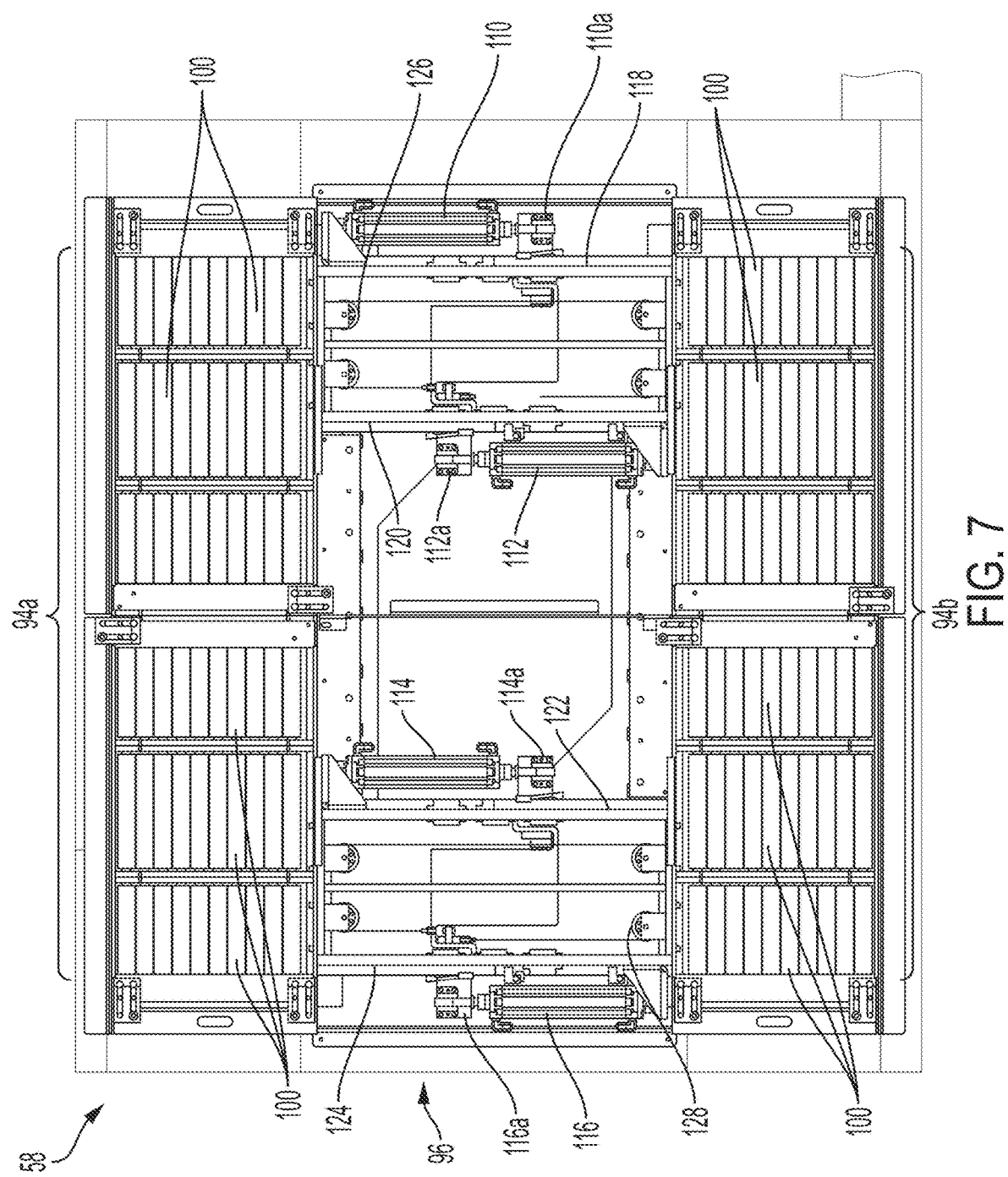
FIG. 7 is a bottom plan view of the rearward wheel assembly supports of the vehicle centering system of FIG. 3.

With reference to FIGS. 3, 4 and 7, rearward wheel support and centering assembly 58 includes oppositely disposed tire supports 94a, 94b positioned on opposite sides of rearward vehicle centering device 96, where tire supports 94a, 94b are configured to receive the tires of a pair of opposed tire and wheel assemblies of vehicle 34, such as the rear wheel assemblies 62 as shown in FIG. 1. Tire supports 94a, 94b are substantially identical, but mirror versions of each other. As such, the discussion herein focuses on tire support 94a, but it should be appreciated that the discussion applies to tire support 94b.

Tire support 94a includes six sets 98a-98f of rollers 100 in the illustrated embodiment, with the rollers 100 arranged with their axes of rotation parallel with the longitudinal axis of the vehicle 34 when disposed on support stand 42. As such, a vehicle having a pair of rear tires disposed on rollers 100 will be moveable laterally with respect to its longitudinal axis via the rollers 100. In contrast to forward wheel support and centering assembly 56, the rollers 100 of the rearward wheel support and centering assembly 58 all lie in the same plane. The multiple sets 98a-98f of rollers 100 enable vehicles with differing wheelbases to be used on support stand 42. That is, for example, when the opposed forward wheel assemblies of vehicles are retained by tire supports 64a, 64b, the opposed rearward wheel assemblies of the vehicle can still be positioned on tire supports 94a, 94b even with differing wheelbase lengths of the vehicles. Ramps may also be provided at the entrance and exists to tire supports 94a, 94b to aid in the driving of vehicles thereon and off.

Vehicle 34 is also centered or positioned on support stand 42 in part via rearward vehicle centering device 96, which operates in generally like manner to vehicle centering device 66 to center or position the rearward portion of vehicle 34. Rearward vehicle centering device 96 includes multiple pairs of opposed and synchronized locator arms or bumpers 102a, 102b, 104a, 104b and 106a, 106b that are configured to extend outwardly from housing 108 to contact the inner sidewalls of the tires disposed on tire supports 94a, 94b. In particular, each set of opposed arms of centering device 96 are synchronized to move outwardly from housing 108 equally and simultaneously in opposed directions via actuators 110, 112, 114, 116 (FIG. 7) that are linked together and operated by controller 40. Arms 102a, 102b, 104a, 104b, 106a and 106b are slidably mounted for movement on rails or slides 118, 120, 122 and 124, whereby moveable ends 110a, 112a, 114a, 116a of actuators 110, 112, 114, 116 are able to extend and retract arms 102a, 102b, 104a, 104b, 106a and 106b relative to housing 108, including via the pulley linkages 126, 128. It should thus be appreciated that vehicle centering device 96 is operable to center the rearward portion of vehicle 34 on vehicle support stand 42 by way of the rollers 100 allowing the vehicle to be laterally moved via equal and opposite extension of arms 102a, 102b, 104a, 104b, 106a and 106b whereby the arms contact and push against the inner sidewall of the tires.

Figure 11:
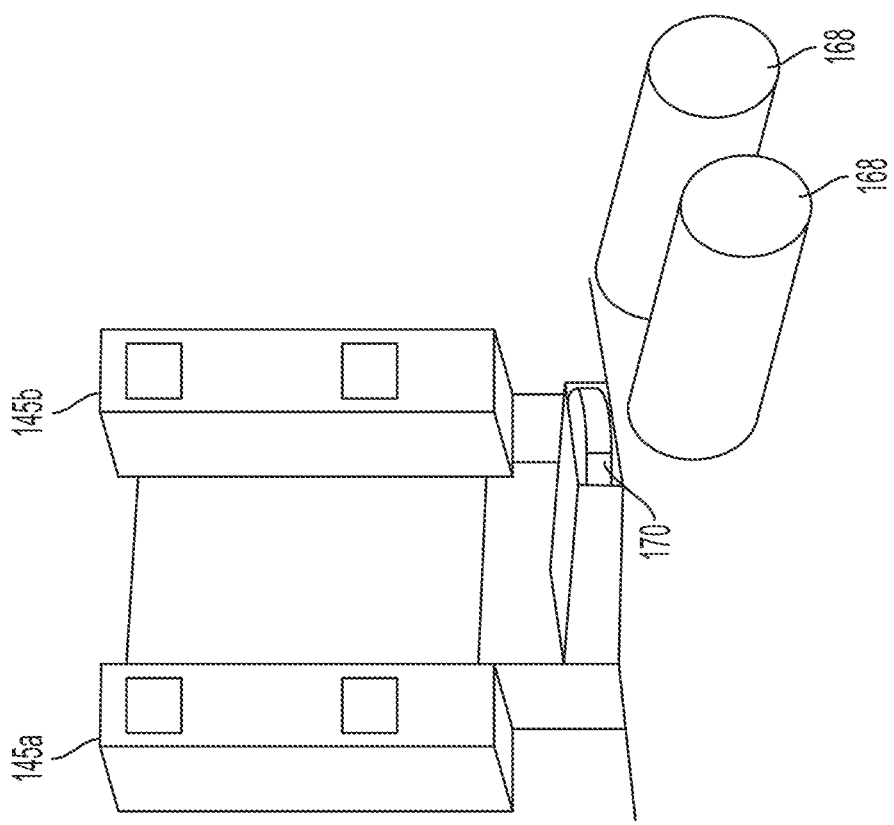
FIG. 11 is a partial perspective view of a portion of the robotic target alignment system of FIG. 8 showing a non-contact wheel alignment sensor and locator arm adjacent rollers for receiving the wheel assembly of a vehicle.
Figure 15:
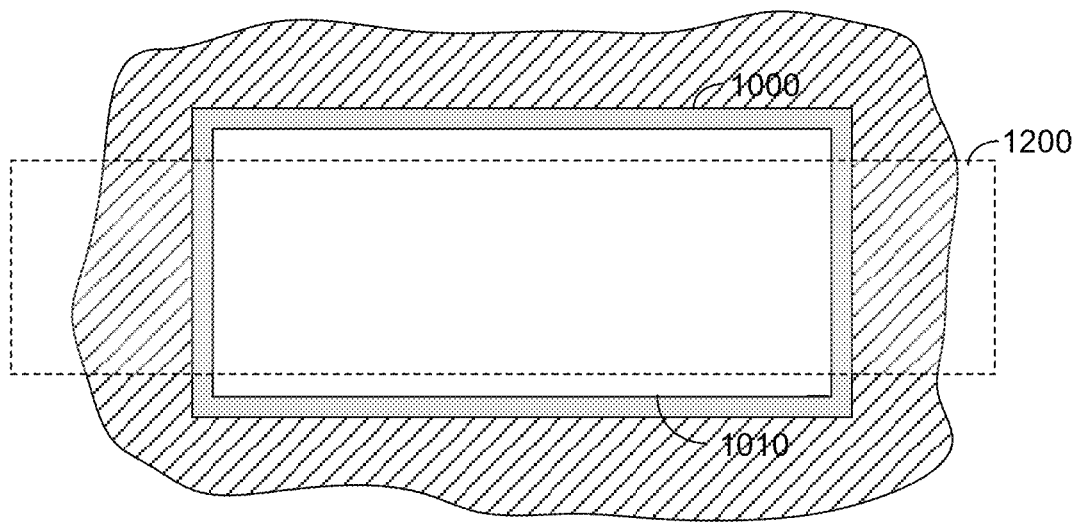
FIG. 15 is a top view of an alternative tire support for use in connection with the present invention constructed as a floating plate.

Although vehicle support stand 42 is shown in the illustrated embodiment to position, center and/or orient the vehicle 34 by arms pushing against the inner sidewall of the tires, it should be readily appreciated that an alternatively constructed centering system could be constructed in which arms or bumpers press against the outer sidewall of the tires by pushing inwardly an equal and opposite amount from the outside of the vehicle, such as inwardly extending locator arms discussed below in connection with FIG. 11. Moreover, although tire supports 64a, 64b and 94a, 94b of system 30 are disclosed as utilizing rollers 72, 100 for lateral adjustment of vehicle 34 on support stand 42, it should be appreciated that alternative tire supports may be employed within the scope of the present invention. For example, tire supports may be constructed as floating fixtures, such as conventional floating or float plates. Such a floating plate assembly 1000 is shown in FIG. 15 with a tire of a tire and wheel assembly 1200. As there shown, floating plate assembly 1000 is recessed into the vehicle support stand and is configured to freely float the vehicle wheel assembly 1200 on a plate 1010 in multiple degrees of freedom, including laterally with respect to the longitudinal axis of the vehicle.

With vehicle 34 centered or oriented on stand 42 via the vehicle centering devices 66, 96, a desired target 36 is held by tool 39 and manipulated by a multi-axis robotic manipulator 38 to position the target 36 for use in aligning or calibrating the one or more sensors 32 of the vehicle 34. That is, the target 36 is oriented with respect to the vehicle 36. In another aspect of the present invention, once a particular vehicle has been oriented on the stand 42, the robotic manipulator 38 is configured to select a particular target for a desired alignment or calibration of a particular sensor of that vehicle, and to position that selected target for the particular vehicle such that the appropriate target is in position for performing any desired alignment or calibration of the sensor of that particular vehicle 110.

The location at which target 36 is positioned by robot 38 is programmed into controller 40, such as based on the vehicle make and model and particular sensor that is to be aligned/calibrated. For example, with vehicle 34 centered on stand 42, robot 38 may be used to locate target 36 to a particular position based on a reference point corresponding to the required location for the target 36 based on the position of the vehicle 34. The reference point may thus be defined as a relationship between the target 36 and the centering system 66, 96 of the stand 42. Such a reference point or spatial relationship allows for the accurate placement of the calibration/alignment targets positioned by the robotic manipulator 38. In a particular embodiment, as discussed in more detail below, a master positioned on stand 42 may be used in determining reference points for a vehicle, such as for particular sensors of a given make and model of vehicle.

As understood from FIG. 1, vehicle support stand 42 and target positioning system 44 are disposed at the same vertical height whereby a vehicle may be driven onto and off of system 30. For example, stand 42 and system 44 may be arranged within a pit or with entry and exit ramps, whereby a vehicle 34 may be driven onto stand 42 for the performance of an alignment and calibration routine, with the vehicle 34 then driven in the same direction to exit from system 30. Robot 38 may be moved longitudinally rearwardly, with vehicle 34 then driven off to the left or right. The support stand 42 and target positioning system thus define or include a stationary support surface 129 upon and over which vehicle 34 is able to be moved or driven, with the wheel assembly supports 56, 58 and robot track 48 being disposed in or at support surface 129. As understood from FIGS. 1 and 2, robot track 48 includes an upper track surface 53 that is additionally configured to enable vehicle 34 to be driven thereover based on rails 50 being disposed below the upper track surface 53.

Figure 8:
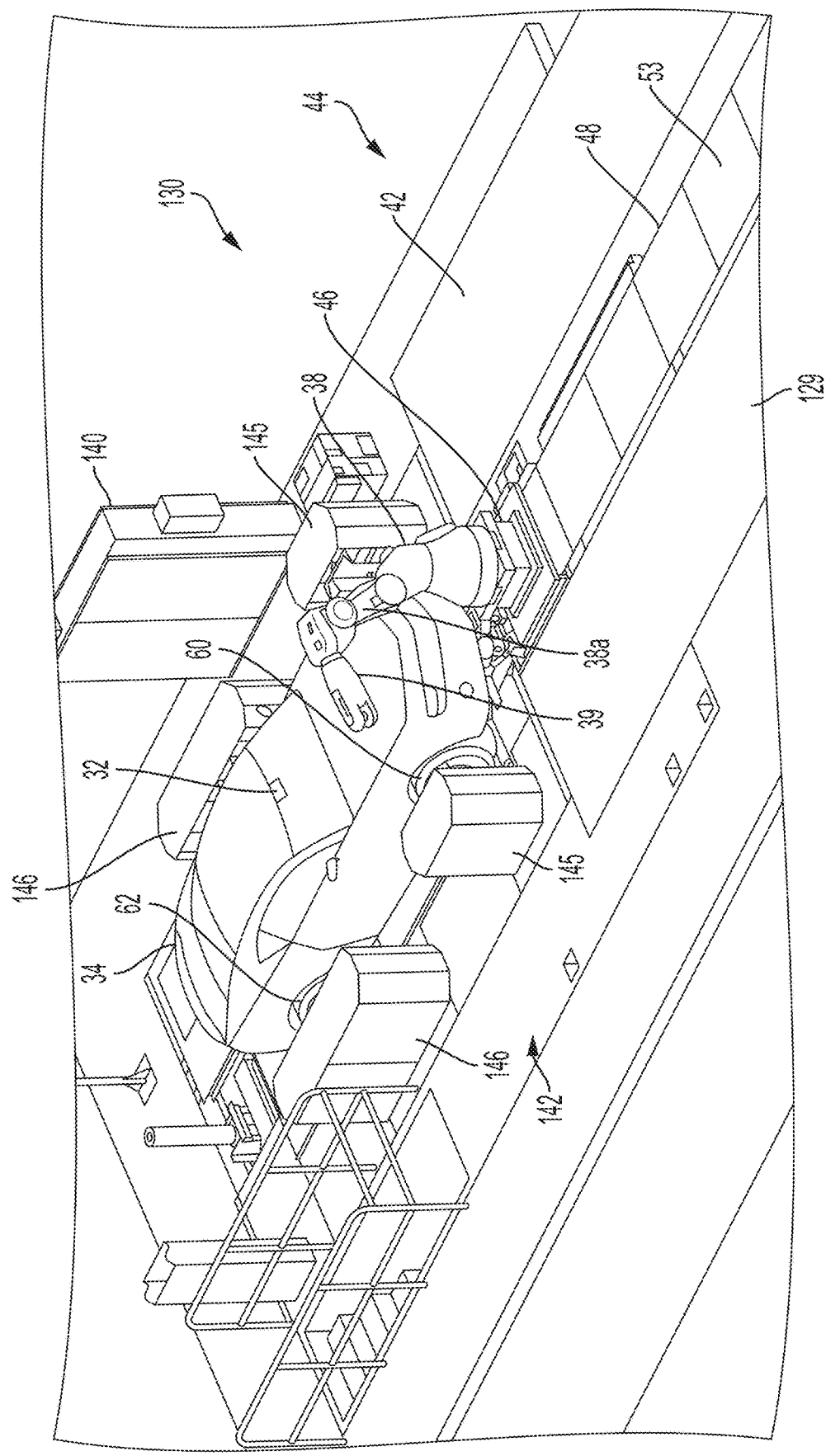
FIG. 8 is a perspective view of another robotic target alignment system for calibration of a sensor of a vehicle in accordance with the present invention.
Figure 9:
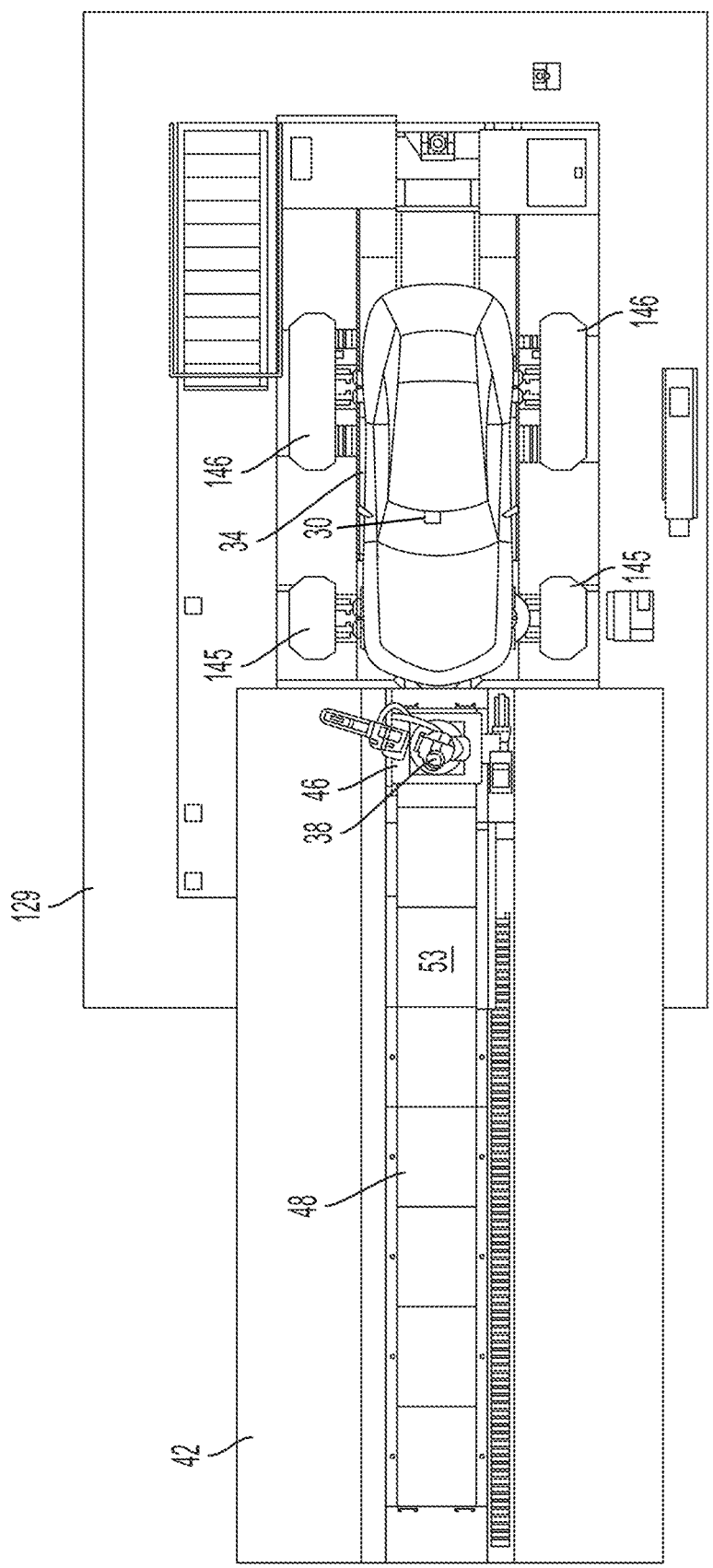
FIG. 9 is a top plan view the robotic target alignment system of FIG. 8.

With reference now to FIGS. 8 and 9, an alternative robotic target alignment and ADAS sensor calibration system 130 is disclosed, where system 130 is generally similar to system 30 discussed above. System 130 is thus used for aligning a target, such as target 36, relative to vehicle 34, and in particular to a sensor 32 of vehicle for calibration/alignment of the sensor. System 130 includes a target positioning system 44 in like manner to system 30, as well as a vehicle support stand 142. In the illustrated target positioning system 44 of FIGS. 8 and 9, robot 38 is not holding a target, whereby it is understood that arm portion 38a is able to retain tool 39 and any of numerous targets, such as target 36. As noted, base 46 is able to traverse longitudinally along track 48 via signals from computer system or controller 140. As understood from FIGS. 8 and 9, system 130 is constructed whereby an operator is able to work beneath vehicle support stand 142. System 130 may be used, for example, in a repair facility whereby the operator may be able to conveniently perform additional operations on vehicle 34, such as adjustment of the alignment of vehicle 34 based on the alignment information from NCA sensors 145.

Vehicle support stand 142 utilizes a non-contact wheel alignment sensor system for determining an orientation of the vehicle, where in the illustrated embodiment non-contact wheel alignment sensors 145, 146 are disposed about the opposed front wheel assemblies 60 and the opposed rear wheel assemblies 62, respectively. The non-contact wheel alignment sensors 145, 146 are utilized to obtain position information of vehicle 34 on stand 42, which is provided to controller 140, with controller 140 in turn operates robot 38 to position a target 36 relative to a sensor 32 of vehicle 34.

The wheel alignment sensors 145, 146 may be used for determining the vertical center plane of the vehicle 34, as well as or part of the determination of wheel alignment characteristics such as toe, camber, caster, steering axis inclination (SAI), as well as the wheel center, axis of symmetry, and rear thrust angle. In the illustrated embodiment of system 130, four non-contact wheel alignment sensors 145, 146 are shown disposed about vehicle 34, it should be appreciated that alternative arrangements may be employed. For example, an alternative arrangement may employ non-contact wheel alignment sensors at just two wheel assemblies of vehicle 34, such as opposed wheel assemblies. The rear thrust angle may be determined using sensor 146 by, for example, rotating the rear tire and wheel assemblies 62 into two or more positions, such as by rotating the assemblies 62 using motorized rollers supporting the assemblies 62. Alternatively, the vehicle may be moved between positions, depending on the configuration of the non-contact wheel alignment sensors being utilized.

Figure 10:
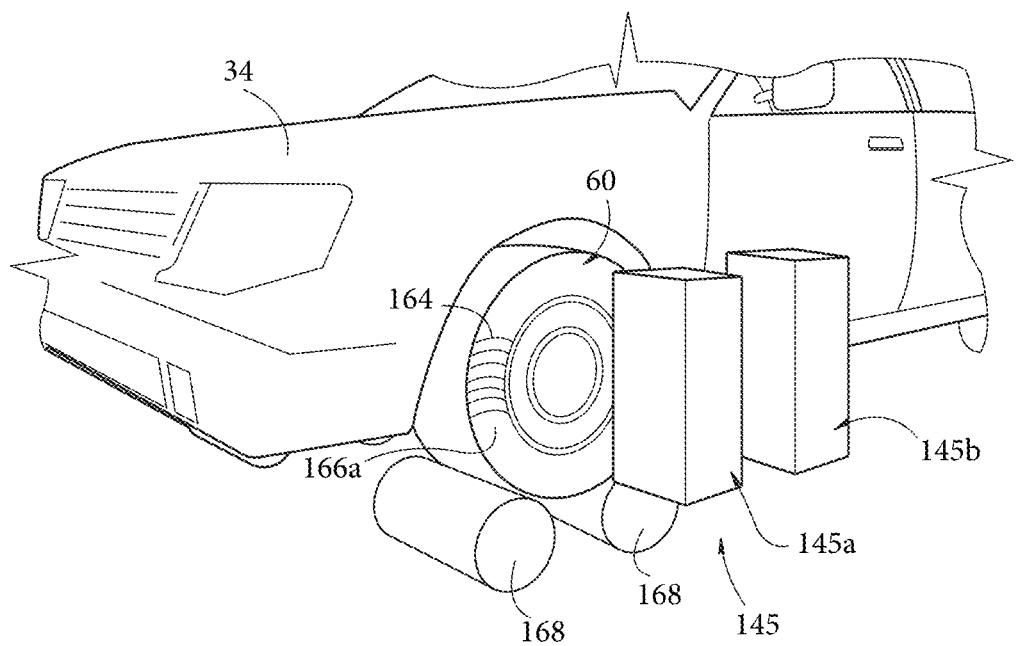
FIG. 10 is a side perspective view of non-contact wheel alignment sensors of the robotic target alignment system of FIG. 8 disposed about the left front wheel assembly of the vehicle.

The non-contact wheel alignment sensors 145, 146 shown in FIGS. 8 and 9 include an exterior cover or housing. As understood from FIG. 10, each non-contact wheel alignment sensor 145, 146 in the illustrated embodiment includes a pair of cooperatively operating individual non-contact wheel alignment sensors 145a, 145b arranged to be disposed on the left and right sides of a given wheel assembly of a vehicle. In the illustrated embodiment of FIG. 10 non-contact wheel alignment sensors 145 are constructed in accordance with U.S. Pat. Nos. 7,864,309, 8,107,062 and 8,400,624, which are incorporated herein by reference. As shown, a pair of non-contact wheel alignment ("NCA") sensors 145a, 145b are disposed on either side of a tire and wheel assembly 60 of vehicle 34. NCA sensors 145a, 145b project illumination lines 164 onto either side of the tire, with left side 166a shown. NCA sensors 145a, 145b receive reflections of illumination lines 164, by which the non-contact wheel alignment system is able to determine the orientation of the tire and wheel assembly 60. The multiple illumination lines 164 projected onto the tire and wheel assembly 60 and the position of those lines 164 in the acquired image enable the three dimensional spatial orientation or geometry of the tire and wheel assembly 60 to be calculated throughout the working area of the sensors 145a, 145b based on the field and depth of view of the sensors. Corresponding NCA sensors 145a, 145b are positioned about all four tire and wheel assemblies 60, 62 of vehicle 34 whereby vehicle position information can be determined by the non-contact wheel alignment system, which may be based on a known orientation of the sensors NCA sensors 145a, 145b disposed about vehicle 34 on stand 142. Rearward non-contact wheel alignment sensors 146 may be longitudinally adjustable to accommodate vehicles of differing wheelbase length. As noted, the wheel alignment and vehicle position information is provided to a controller, such as controller 140, or to a remote computing device, such as via the Internet. In response to the wheel assembly alignment and vehicle position information, the controller 140 or a remote computing device may then operatively send signals for operating the robot 38 to position a target 36 relative to a sensor 32 of vehicle 34. In an alternative arrangement a single non-contact wheel alignment sensor may be configured to project lines on both the left and right sides of a tire of a tire and wheel assembly and image the corresponding reflections for purposes of determining the wheel geometry and associated vehicle position.

In the illustrated embodiment, vehicle support stand 142 includes tire supports comprising pairs of rollers 168 disposed at each of the wheel assemblies 60, 62 of vehicle 34, whereby wheel assemblies 60, 62 may be rotated during the alignment and position analysis while vehicle 34 remains stationary on stand 142. The rearward pair of rollers 168 may be longitudinally moveable to accommodate vehicles of differing wheelbases. Moreover, as understood from FIG. 11, extendable and retractable locator arms 170 may be positioned at each non-contact wheel alignment sensor 145, where the locator arms 170 may be extended to contact the outer sidewall of the tire of a tire and wheel assembly disposed on rollers 168 to aid in retaining vehicle 34 in a fixed location while on rollers 68. It should further be appreciated that rollers 168 may be driven to rotate the tire and wheel assembly thereon, whereby the vehicle may be laterally moved, such as via force from locator arms 170.

It should be appreciated that alternative NCA sensors relative to sensors 145a, 145b may be employed, including systems utilizing stands upon which a vehicle remains stationary and the wheel alignment and vehicle position information is measured at two separate locations, as well as drive-through non-contact alignment systems in which the vehicle position is determined. For example, robotic alignment of a target in front of a vehicle for calibration of vehicle sensors may be performed using a system for determining wheel alignment and vehicle position based on movement of a vehicle past a vehicle wheel alignment sensor, which systems are known in the art. Based on vehicle orientation and alignment information from such sensors a controller may determine a location for placement or positioning of a target adjustment frame, as disclosed above. For example, the vehicle may be driven along or by such sensors located on either side of the vehicle and come to a stop within the sensor field whereby the controller 140 is able to position the target 36 at the appropriate location relative to the vehicle 34, and in particular relative to the sensor of the vehicle that is to be aligned or calibrated. Such drive-through systems are known in the art.

In accordance with another aspect of the present invention, a chassis height of the vehicle 34 may be determined to further aid in orientating a target via a robotic manipulator relative to the position of the vehicle. For example, the chassis height may be determined at multiple locations about the vehicle such that an absolute height, pitch, and yaw of a vehicle mounted sensor (e.g., an LDW or ACC sensor) may be determined. The chassis height measurements may include fender height measurements. Any conventional method for determining a chassis height of the vehicle may be used. For example, one or more leveled lasers may be aimed at additional height targets mounted to the vehicle, such as height targets that are magnetically mounted to the vehicle, such as mounted to the fenders, or other locations on the vehicle. In another example, the non-contact wheel alignment sensors 145 described herein may be used to obtain a fender height where, for example, the projected light may be projected on to portions of the vehicle, such as the fender at or adjacent the wheel wells.

Figure 12:
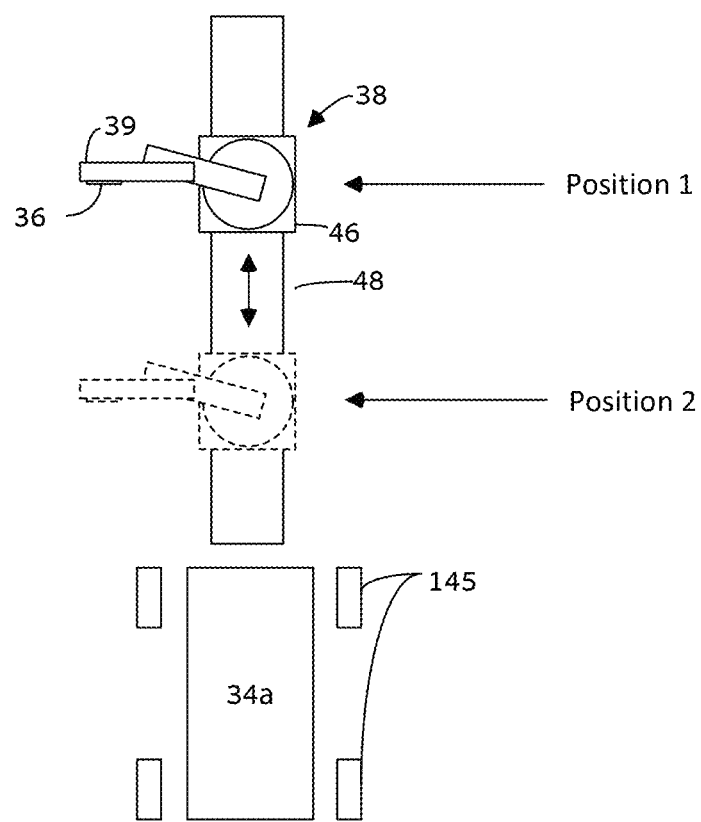
FIG. 12 is a top elevation view of a robot in two calibration positions with respect to a calibration master.

The determination of reference points for locating of targets relative to a vehicle on support stand 42 or support stand 142 may also be done via a calibration process. In one example of a calibration process, with reference to FIG. 12, a calibration master 34a may be positioned on a support stand, such as a support stand 142 having non-contact wheel alignment sensors 145, where master 34a may be a specifically configured object having known dimensions or a vehicle that is accurately measured and is disposed in a known position on stand 142 via use of non-contact wheel alignment sensors 145. The master 34a may also be equipped with a light projector that is accurately oriented to the centerline of the calibration master 34a, with the calibration master 34a configured such that the light projector directs a light to align the centerline of the 34a with the robot 38. For example, a target held by the robot 38 may be oriented into position by jogging of the robot 38 until the light projected from the master 34a impinges upon a desired location of the target, whereby the controller 140 is "taught" the particular location and is operable to position targets accordingly. Alternatively, during calibration the robot 38 may optionally be moved between two distances shown as "Position 1" and "Position 2" in FIG. 12 for aligning the target 36 with the calibration master 34a.

For example, at Position 1 the robot 38 may be adjusted to align the target 36 into a desired orientation relative to the light projector, such as by jogging the position of the robot to position the target 36 whereby the projected light impinges at a desired location. The robot 38 is then moved to Position 2 and the robot 38 is again adjusted to align the target 36 into the desired orientation relative to the light projector by jogging the position of the robot 38 to position the target 36 whereby the projected light again impinges at the desired location. In this manner the axis of the calibration master 34a to the target 36 is established and known. As discussed herein, there may be a calibration master 34a for each type of vehicle (e.g., automobile, pickup truck, van), or in the alternative, there may be a calibration master 34a for each make and model of vehicle to undergo alignment/calibration. Similar calibration processes may be employed with stand 42, where the calibration master 34a is positioned via centering devices 66, 96. It should be appreciated that in the case of system 130, the actual vehicle orientation determinations obtained via non-contact wheel alignment sensors 145 for a given vehicle 34 may be used as offsets to adjust the position of the target 36 relative to the predetermined positions based on the master 34a.

Figure 13:
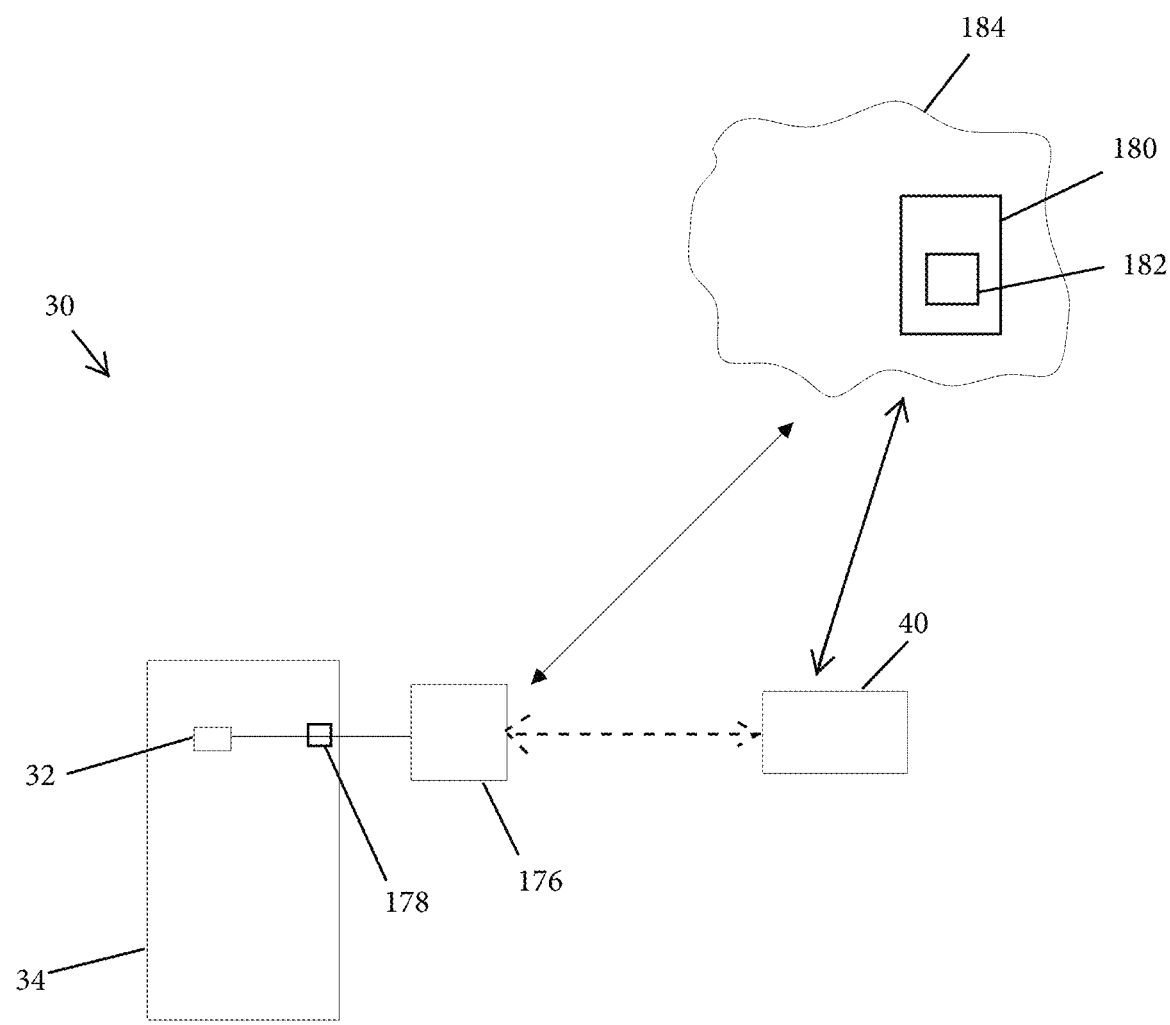
FIG. 13 is a schematic illustration of remote processes operations of a robotic target alignment system in accordance with the present invention.

The above discussed robotic alignment and calibration systems 30, 130 may be configured to operate independently of external data, information or signals, in which case the computer system of the embodiment that comprises the noted controller 40, 140 may be programmed for operation with various makes, models and equipped sensors, as well as may include use of an operator computer device. In such a standalone configuration, as illustrated in FIG. 13 with regard to system 30, operator computer device 176 may interface with vehicle 34, such as via one or more ECUs 178 of vehicle 34 that may be interfaced via an on-board diagnostic (OBD) port of vehicle 34, as well as with controller 40 to provide instructions to an operator and run system for alignment/calibration of sensor 32. Alternatively, operator computer device 176 may receive information input by an operator regarding vehicle 34, such as make, model, vehicle identification number (VIN) and/or information regarding the equipped sensors, such as by manual entry or scanning, with device 176 communicating such information to controller 40.

Alternative to such a standalone configuration, FIG. 13 also discloses an exemplary embodiment of a remote interface configuration for system 30 where system 30 is configured to interface with a remote computing device or system 180, such as a server, and one or more remote databases 182, such as may be accessed via an Internet 184, whereby the computer system thus further comprise the remote computing device 180. For example, remote computing device 180 incorporating a database 182 accessed via the Internet, may be used to run a calibration sequence through one or more engine control units ("ECUs") of the vehicle 34 to calibrate one or more ADAS sensors pursuant to pre-established programs and methodologies, such as based on original factory-employed calibration sequences or based on alternative calibration sequences. In such a configuration, controller 40 need not contain programs related to target positioning parameters for particular makes, models and equipped sensors. Rather, an operator may connect operator computer device 176 to an ECU 178 of vehicle 34, with computer device 176 then transmitting acquired vehicle specific information to computing system 180, or alternatively an operator may enter information directly into operator computer device 176 without connecting to vehicle 34 for transmitting to computing system 180. Such information may be, for example, make, model, vehicle identification number (VIN) and/or information regarding the equipped sensors. Computing system 180 may then provide the necessary instructions to the operator based on specific procedures required to calibrate sensors as set forth in databases 182 and specific processing performed by computing system 180, with control signals then transmitted to controller 40. For example, computing system 180 may provide instructions to controller 40 for positioning of target 36 via robot 38, as well as to run an OEM calibration sequence of sensor 32, such as via ECU 178.

Databases 182 may thus contain information for performing calibration processes, including, for example, information regarding the specific target to be used for a given vehicle and sensor, the location at which the target is to be positioned by robot 38 relative to such a sensor and vehicle, and for performing or activating the sensor calibration routine. Such information may be in accordance with OEM processes and procedures or alternative processes and procedures. In either embodiment various levels of autonomous operation by system 30 may be utilized.

Figure 14:
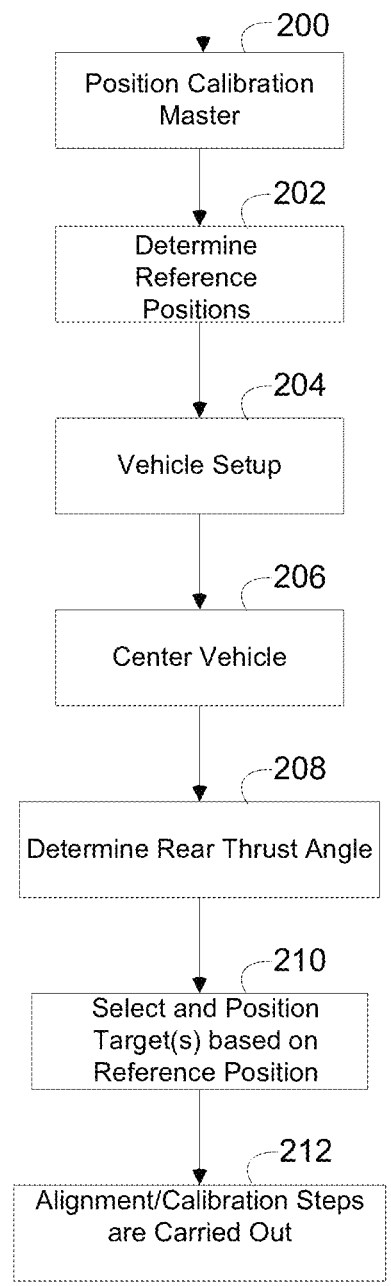
FIG. 14 illustrates steps to a method for aligning a calibration target and performing calibration of a vehicle sensor in accordance with aspects of the present invention

An exemplary calibration cycle in accordance with an embodiment of the present invention is illustrated in FIG. 14. At step 200, a calibration master 34a is positioned upon the vehicle support stand 42, 142 of the test system 30, 130 and placed into a particular orientation. In the case of system 30, centering devices 66, 96 are used to position the calibration master 34a, and in the case of system 130, locator arms 170 at each non-contact wheel alignment sensor 145 are used to position the calibration master 34a by contacting the sides of the calibration master 34a to place the calibration master 34a into the particular orientation. With the calibration master 34a orientated, in step 202 of FIG. 14, one or more reference positions or points can be determined between a target 36 or the robot 38 and the calibration master 34a, this includes both longitudinally, laterally and vertically, as well as about rotations of the given axes. The calibration master 34a may then be removed from the vehicle support stand 42, 142.

In step 204 of FIG. 14 a vehicle 34 is setup for testing. For example, the vehicle 34 is entered onto the stand 42, 142 whereby the wheels of the vehicle are positioned on the rollers of the test stand and such that the vehicle 34 is roughly aligned with the target 36. The car model and version is also entered into the calibration system 30, 130, such as via an operator computing device 176, while an OBD2 connector is connected to an OBD2 port of the vehicle 34 and a communication connection is achieved between the vehicle 34 and the controller 40, 140.

In step 206 of FIG. 14, the vehicle 34 is placed into the same orientation as the calibration master 34a. In the case of system 30, centering devices 66, 96 are used to orient the vehicle, and in the case of system 130, the locator arms 170 engage the tire sidewalls and the non-contact wheel alignment sensors 145 are used to obtain the orientation of the vehicle 34. An operator may initiate an automated positioning/orientating operation via the controller 40, 140 and/or via an operator computing device 176.

A thrust angle of the vehicle 34 may be desired or required for calibration of certain sensors such that, as illustrated in FIG. 14 at step 208, a thrust angle may be determined. In the case of system 130, for example, the thrust angle may be determined based on the calculations and measurements performed by the non-contact wheel alignment sensors 145. The determined thrust angle may then be used in the positioning of the target 36 by robot 38 via controller 140.

In step 210 of FIG. 14, a given target 36 is selected and positioned for the individual ADAS system calibration. As discussed herein, an operator may initiate an automated target selection and positioning operation for a given ADAS sensor 32 via the controller 40, 140 or operator computing device 176. The target selection and positioning operation may take into account the make and model of the vehicle, as well as the calibration/alignment procedures for a particular ADAS sensor 32 that may have been selected by an operator. In positioning the target 36, the target 36 is positioned with respect to the predetermined reference point or positions, such that the selected targets 36 is properly centered and positioned relative to the vehicle 34, and in particular relative to the particular sensor 32 that is to be calibrated.

In step 212 of FIG. 14, calibration of the ADAS systems (e.g., ACC, LDW, and NIVI) in the vehicle 110 may be performed, such as pursuant to an OEM calibration routine. Based on the fixed and known orientation of the vehicle 34, individual sensor calibration operations, such as for the LDW, ACC, and the like, may be performed with minimal operator interaction required.

It should be appreciated that the steps listed above with regard to the operation of FIG. 14 may be alternatively performed, such as in particular sequence, process or operation, and still be in accordance with the present invention.

Figure 16:
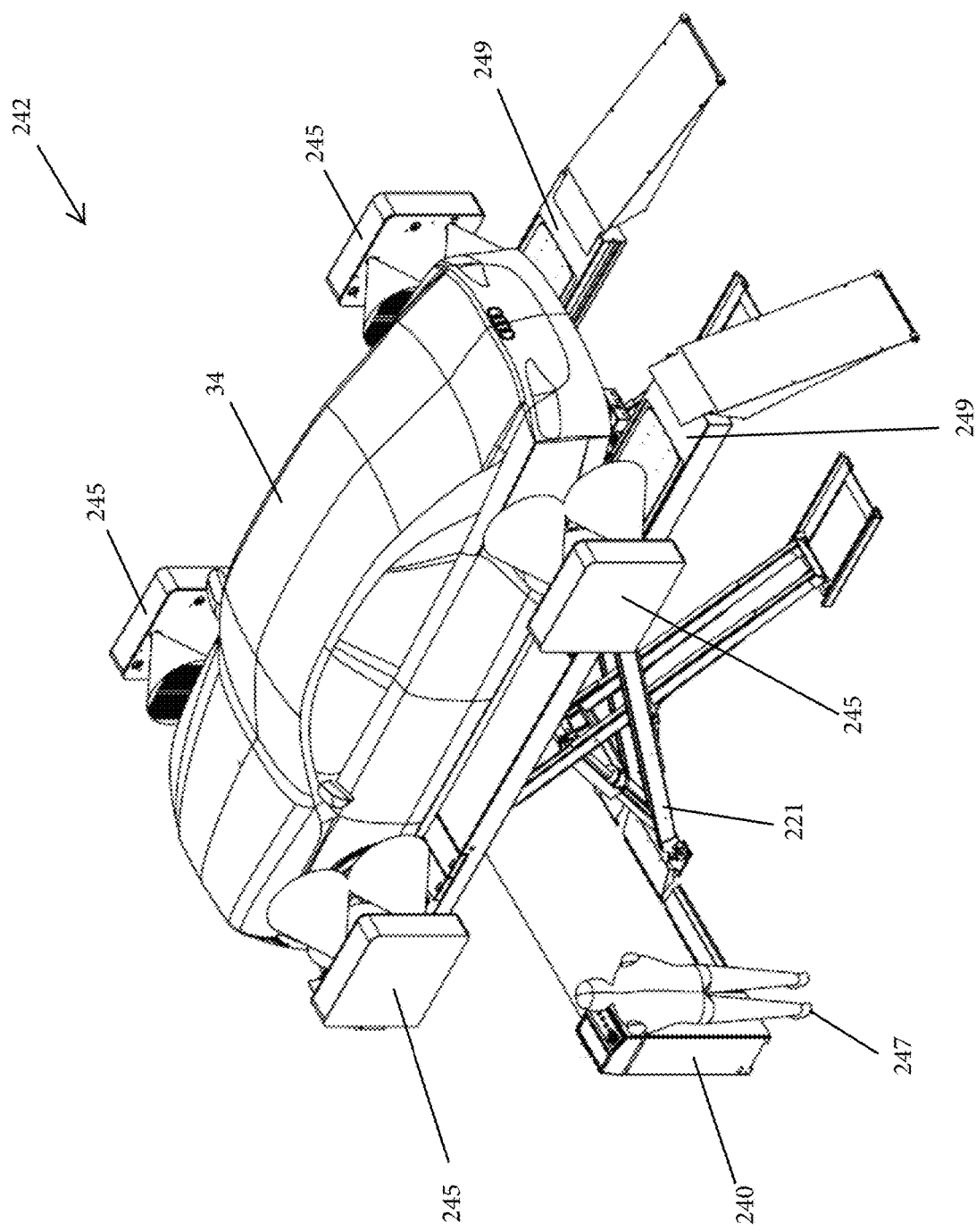
FIG. 16 is a perspective view of an alternative vehicle support stand for use in connection with the present invention.

Still another alternative vehicle support stand 242 is illustrated in FIG. 16, where vehicle support stand 242 is configured as a lift 221 that is useable with the target position system 44 of FIGS. 1 and 8. Support stand 242 may be used, for example, in a repair facility whereby an operator 247 may be able to conveniently perform additional operations on vehicle 34, such as adjustment of the alignment of vehicle 34, in addition to calibration of ADAS sensors on vehicle 34. In particular, for example, alignment of vehicle 34 may be performed based on the alignment information from NCA sensors 245 mounted to lift 221, where sensors 245 may be constructed in like manner to NCA sensors 145, 146 discussed above. FIG. 16 additionally illustrates the inclusion of a combined controller and operator computing device 240 for use by operator 247. Alternatively, lift 221 may be employed with centering devices in similar manner to centering devices 66, 96 disclosed above for centering vehicle 34 on stand 242 for calibration of ADAS sensors 32 on vehicle 34 without use of NCA sensors 245.

In use, vehicle 34 is driven onto runways 249 of lift 221 when lift 221 is in a lowered orientation. Vehicle 34 is then positioned into an initial position and NCA sensors 245 are used to determine wheel alignment of vehicle 34 as well as position of vehicle 34 on stand 242. Vehicle 34 may then be positioned into a second position or calibration orientation, such as by rolling vehicle 34 whereby the wheels turn 180 degrees. NCA sensors 245 are then again used to determine wheel alignment of vehicle 34 as well as position of vehicle 34 on stand 242. The two sets of determinations enable the determination of runout-compensated thrust angle of vehicle 34, where by a target 36 held by robotic manipulator 38 of target position system 44 may be positioned into a desired orientation for calibration of an ADAS sensor of vehicle 34. It should be understood that although lift 221 is shown in an elevated orientation in FIG. 16, lift 221 could be lowered to be generally planar with target position system 44 for calibration of sensors on vehicle 34. Alternatively, the calibration of sensors via target 36 held by robotic arm 38 may be performed while lift 321 is in the elevated position.

Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A robotic system for aligning a target to an equipped vehicle for calibration of a sensor on the equipped vehicle, said system comprising:
   a vehicle support stand upon which an equipped vehicle is stationarily disposed in an established known position for calibration of a sensor on the equipped vehicle;
   a robotic manipulator that is moveable longitudinally toward and away from said vehicle support stand, wherein the robotic manipulator comprises a multi-axis robotic arm;
   a target, with said robotic arm configured to moveably hold said target for multi-axis movement of said target;
   wherein said robotic manipulator is configured to position said target into a calibration position relative to the sensor on the equipped vehicle by longitudinal movement of said robotic manipulator relative to said vehicle support stand and by movement of said robotic arm based on the established known position of the equipped vehicle on said vehicle support stand whereby the sensor is able to be calibrated using said target.

2. The robotic system of claim 1, wherein said robotic manipulator includes an end-effector disposed on said robotic arm, wherein said end-effector is configured to selectively grasp said target from a plurality of targets.

3. The robotic system of claim 1, wherein said robotic manipulator is mounted to a base, and wherein said base is longitudinally moveable along a track in a floor support surface.

4. The robotic system of claim 3, wherein said track includes rails along which said base is moveable with said rails disposed vertically lower than said floor support surface.

5. The robotic system of claim 1, wherein said vehicle support stand comprises a plurality of locator arms with said locator arms being extendable and retractable and configured to press against tire and wheel assemblies of the equipped vehicle to orient the equipped vehicle on said vehicle support stand.

6. The robotic system of claim 5, wherein said locator arms comprise sets of forward opposed arms and rearward opposed arms, wherein said forward opposed arms are configured to extend equally in opposite directions from each other and said rearward opposed arms are configured to extend equally in opposite directions from each other.

7. The robotic system of claim 1, wherein said vehicle support stand comprises moveable forward tire supports and moveable rearward tire supports upon which the opposed sets of tires of the equipped vehicle are disposed.

8. The robotic system of claim 7, wherein the forward tire supports comprise forward rollers and/or the rearward tire supports comprise rearward rollers.

9. The robotic system of claim 8, wherein the axis of rotation of the forward rollers and/or the axis of rotation of the rearward rollers is aligned with the longitudinal axis of the equipped vehicle.

10. The robotic system of claim 1, wherein said vehicle support stand comprises a pair of moveable forward tire supports upon which each of the forward opposed sets of tires of the equipped vehicle are disposed, and wherein each said forward tire support comprises two sets of rollers, and wherein said two sets of rollers of each said forward tire support are angled together in a V-shaped configuration for locating the equipped vehicle.

11. The robotic system of claim 10, wherein said vehicle support stand comprises a pair of moveable rearward tire supports upon which each of the rearward opposed sets of tires of the equipped vehicle are disposed, and wherein each said rearward tire support comprises at least one set of rollers.

12. The robotic system of claim 1, wherein said vehicle support stand comprises a forward centering device, wherein said forward centering device is disposed beneath the equipped vehicle when the equipped vehicle is disposed on said vehicle support stand, and wherein said forward centering device comprises a pair of locator arms configured to extend outwardly synchronously to engage an inner side of the forward tire and wheel assemblies of the equipped vehicle.

13. The robotic system of claim 12, wherein said vehicle support stand comprises a rearward centering device, wherein said rearward centering device is disposed beneath the equipped vehicle when the equipped vehicle is disposed on said vehicle support stand, and wherein said rearward centering device comprises a pair of locator arms configured to extend outwardly synchronously to engage an inner side of the rearward tire and wheel assemblies of the equipped vehicle.

14. The robotic system of claim 1, wherein said vehicle support stand further comprises a pair of forward non-contact wheel alignment sensors disposed adjacent the forward opposed tire and wheel assemblies of the equipped vehicle when disposed on said vehicle support stand, and wherein said forward non-contact wheel alignment sensors are operable to determine vehicle orientation information to determine the established known position of the equipped vehicle for use in positioning said target into said calibration position.

15. The robotic system of claim 14, wherein said vehicle support stand further comprises a pair of rearward non-contact wheel alignment sensors disposed adjacent the rearward opposed tire and wheel assemblies of the equipped vehicle when disposed on said vehicle support stand, and wherein said rearward non-contact wheel alignment sensors are operable to determine vehicle orientation information to determine the established known position of the equipped vehicle for use in positioning said target into said calibration position.

16. A method for robotically aligning a target to an equipped vehicle for calibration of a sensor on the equipped vehicle, said method comprising:
   maneuvering an equipped vehicle onto a vehicle support stand, where the equipped vehicle includes a sensor and is stationarily disposed on the vehicle support stand;
   moving a target held by a robotic manipulator into a calibration position for calibration of the sensor based on an established known position of the equipped vehicle on the vehicle support stand;

wherein the robotic manipulator is moveable longitudinally relative to the longitudinal axis of the equipped vehicle on the vehicle support stand, and wherein the robotic manipulator includes a multi-axis robotic arm with said robotic arm configured to hold said target.

17. The method of claim 16, wherein said robotic manipulator includes an end-effector disposed on said robotic arm, wherein said end-effector is configured to selectively grasp said target from a plurality of targets.

18. The method of claim 16, wherein said robotic manipulator is mounted to a base, and wherein said base is longitudinally moveable along a track in a floor support surface.

19. The method of claim 16, wherein said vehicle support stand comprises a plurality of locator arms with said locator arms being extendable and retractable and configured to press against tire and wheel assemblies of the equipped vehicle to orient the equipped vehicle on said vehicle support stand.

20. The method of claim 16, wherein said vehicle support stand comprises moveable forward tire supports and moveable rearward tire supports upon which the opposed sets of tires of the equipped vehicle are disposed.

21. The method of claim 16, wherein said vehicle support stand further comprises a pair of forward non-contact wheel alignment sensors disposed adjacent the forward opposed tire and wheel assemblies of the equipped vehicle when disposed on said vehicle support stand, and wherein said forward non-contact wheel alignment sensors are operable to determine vehicle orientation information to determine the established known position of the equipped vehicle for use in positioning said target into said calibration position.

22. The method of claim 21, wherein said vehicle support stand further comprises a pair of rearward non-contact wheel alignment sensors disposed adjacent the rearward opposed tire and wheel assemblies of the equipped vehicle when disposed on said vehicle support stand, and wherein said rearward non-contact wheel alignment sensors are operable to determine vehicle orientation information to determine the established known position of the equipped vehicle for use in positioning said target into said calibration position.

\* \* \* \* \*